US010589417B2

United States Patent
Bastian, II et al.

(10) Patent No.: US 10,589,417 B2
(45) Date of Patent: Mar. 17, 2020

(54) AUTOMATED GUIDED VEHICLE (AGV) WITH BATCH PICKING ROBOTIC ARM

(71) Applicant: Bastian Solutions, LLC, Indianapolis, IN (US)

(72) Inventors: William A. Bastian, II, Carmel, IN (US); Aaron M. Jones, Carleton, MI (US)

(73) Assignee: Bastian Solutions, LLC, Indianapolis, IN (US)

( * ) Notice: Subject to any disclaimer, the term of this patent is extended or adjusted under 35 U.S.C. 154(b) by 0 days.

(21) Appl. No.: 16/052,009

(22) Filed: Aug. 1, 2018

(65) Prior Publication Data

US 2018/0333841 A1 Nov. 22, 2018

Related U.S. Application Data

(62) Division of application No. 15/258,079, filed on Sep. 7, 2016, now Pat. No. 10,137,566.

(Continued)

(51) Int. Cl.
*B25J 5/00* (2006.01)
*B66F 9/06* (2006.01)
(Continued)

(52) U.S. Cl.
CPC ............... *B25J 5/007* (2013.01); *B25J 5/02* (2013.01); *B25J 9/0018* (2013.01); *B25J 9/0096* (2013.01); *B25J 9/026* (2013.01); *B65G 47/915* (2013.01); *B66F 9/063* (2013.01); *B66F 9/07* (2013.01); *B65G 2207/34* (2013.01)

(58) Field of Classification Search
CPC ... B66F 9/063; B66F 9/07; B25J 5/007; B25J 5/02; B25J 9/0018; B25J 9/0096; B25J 9/0026; B65G 47/915
See application file for complete search history.

(56) References Cited

U.S. PATENT DOCUMENTS 5,015,145 A 5/1991 Angell et al.
7,967,543 B2 6/2011 Criswell et al.
(Continued)

FOREIGN PATENT DOCUMENTS

EP 0 235 488 B1 9/1987
EP 2 570 372 A1 3/2013
(Continued)

OTHER PUBLICATIONS

European Patent Application 16844995.7 Extended Search Report dated Apr. 29, 2019. 6 pages.
(Continued)

*Primary Examiner* — Ronald P Jarrett
(74) *Attorney, Agent, or Firm* — Woodard, Emhardt, Henry, Reeves & Wagner, LLP

(57) ABSTRACT

A system includes an automated guided vehicle (AGV). A loading table is positioned on the AGV. The loading table is configured and sized to hold more than one storage container. A frame extends from the AGV. A robotic arm is mounted to the frame. In one form, the frame includes a gantry that moves relative to the rest of the AGV. Alternatively or additionally, the robotic arm is able to move relative to the gantry. By holding more than one storage container, the AGV facilitates automatic batch picking or placing of items. The gantry increases the degrees of freedom of movement of the robotic arm.

21 Claims, 29 Drawing Sheets

Related U.S. Application Data

(60) Provisional application No. 62/215,948, filed on Sep. 9, 2015.

(51) Int. Cl.
*B25J 5/02* (2006.01)
*B25J 9/00* (2006.01)
*B25J 9/02* (2006.01)
*B65G 47/91* (2006.01)
*B66F 9/07* (2006.01)

(56) References Cited

U.S. PATENT DOCUMENTS

| | | |
|---|---|---|
| 8,276,739 B2 | 10/2012 | Bastian, II et al. |
| 8,397,897 B2 | 3/2013 | Bastian, II et al. |
| 8,403,614 B2 | 3/2013 | Bastian, II et al. |
| 8,562,277 B2 | 10/2013 | Criswell |
| 9,120,622 B1 | 9/2015 | Elazary et al. |
| 9,785,911 B2 | 10/2017 | Galluzzo et al. |
| 2007/0065258 A1 | 3/2007 | Benedict et al. |
| 2010/0023159 A1 | 1/2010 | Mueller |
| 2012/0179337 A1 | 7/2012 | Doan |
| 2013/0184854 A1 | 7/2013 | Bastian, II et al. |
| 2014/0074341 A1 | 3/2014 | Weiss |
| 2014/0257555 A1 | 9/2014 | Bastian, II et al. |
| 2014/0341695 A1 | 11/2014 | Girtman et al. |
| 2015/0073589 A1 | 3/2015 | Khodl et al. |
| 2015/0082596 A1 | 3/2015 | Carter |
| 2016/0068357 A1 | 3/2016 | Bastian, II |
| 2016/0207711 A1 | 7/2016 | Pankratov et al. |

FOREIGN PATENT DOCUMENTS

| | | |
|---|---|---|
| EP | 2 634 041 A2 | 8/2013 |
| WO | WO 2014/011459 A1 | 1/2014 |

OTHER PUBLICATIONS

Automation with Purpose: Tips for Maximizing Your Investment. Presented by Bastian Solutions at Modex on Apr. 9, 2018. [retrieved Aug. 1, 2018]. 2 pages. Retrieved from the Internet: <URL:https://www.modexshow.com/education/seminar.aspx?ref=attendees&id=1266>.

Automation with Purpose: Tips for Maximizing Your Investment. Presented by Bastian Solutions at Modex on Apr. 9, 2018. Downloaded presentation. 40 pages.

Automation with Purpose: Tips for Maximizing Your Investment. Screenshot of webinar page. Presented by Bastian Solutions at Modex on Apr. 9, 2018. [retrieved Aug. 1, 2018]. 1 page. Retrieved from the Internet: <URL:https://www.modexshow.com/education/seminar.aspx?ref=attendees&id=1266>.

How IoT is Revolutionizing the Supply Chains and What That Means for You. Presented by Bastian Solutions at Modex 2018 on Apr. 10, 2018. [retrieved Aug. 1, 2018]. 2 pages. Retrieved from the Internet: <https://www.modexshow.com/education/seminar.aspx?ref=attendees&id=1351>.

How IoT is Revolutionizing the Supply Chains and What That Means for You. Screenshot of webinar page. Presented by Bastian Solutions at Modex 2018 on Apr. 10, 2018. [retrieved Aug. 1, 2018]. 2 pages. Retrieved from the Internet: <https://www.modexshow.com/education/seminar.aspx?ref=attendees&id=1351>.

International Patent Application PCT/US2016/050618 International Search Report and Written Opinion dated Nov. 30, 2016. 11 pages.

Modex 2018 On-floor Seminars (presented by Bastian Solutions). Atlanta, GA Apr. 9-12, 2018. [retrieved Aug. 1, 2018]. 2 pages. Retrieved from the Internet: <URL:https://www.modexshow.com/education/seminars.aspx?ref=attendees>.

AUTOMATED GUIDED VEHICLE (AGV) WITH BATCH PICKING ROBOTIC ARM

CROSS-REFERENCE TO RELATED APPLICATION

This application is a divisional of U.S. patent application Ser. No. 15/258,079, filed Sep. 7, 2016, which claims the benefit of U.S. Provisional Patent Application No. 62/215,948 filed Sep. 9, 2015, which are hereby incorporated by reference in their entirety.

BACKGROUND

Automated Guided Vehicles (AGVs) are typically used in warehousing and manufacturing environments to automatically perform various material handling functions with no or little human involvement. AGVs are commonly used to improve safety and reduce overhead by limiting the number of employees required to complete specific material handling tasks. While there have been many benefits by using these types of systems, there are still issues with the AGV's inability to be flexible and efficiently handle multiple different stock keeping units (SKUs) in high throughput situations. Under these and other types of conditions, human personnel are still a better and more cost efficient option as compared to AGV systems. For example, in order fulfilment and warehousing, "Eaches" orders are expected to grow in total cases over the next few years and SKU counts are also expected to grow. This growth is driven by eCommerce orders, retail demand, and the desire to introduce new product SKUs more efficiently into the market place. The current "Fast Velocity Eaches" and "Medium Velocity Eaches" processes utilize manual "Pick to Light" techniques and are fairly inefficient in pick rates and carton material flow. In general there are too many people, employee turnover is high because it is a repetitive monotonous job, and pick accuracy and rates vary.

Thus, there is a need for improvement in this field.

SUMMARY

An AGV system has been developed to batch process SKUs by having the AGV configured to carry more than one carton or tote into the working envelope of the robotic arm. In one example, the AGV includes a robotic arm mounted in an inverted position above a loading table on which the cartons or totes are supported, but in other examples, the robotic arm is mounted in other orientations. The robotic arm in one form is mounted to a gantry. The gantry in certain examples is configured to allow the robotic arm to move in one, two, or three spatial dimensions (e.g., x, y, z directions). The gantry in one form is configured to move vertically so that the robotic arm is able to retrieve or place SKUs at various storage locations. For instance, the robotic arm is configured to retrieve SKUs close to or on the floor. In other examples, the gantry holding the robotic arm is able move horizontally along the AGV so that the robotic arm is able to service multiple cartons on the AGV. Generally, the robotic arm has a large number of degrees of freedom that facilitate batch picking/putting of items with the AGV which in turn enhances efficiency because the AGV has to make less return trips in order to load or unload items. In one form, the gantry facilitates the robotic arm having seven (7) or more degrees of freedom. Alternatively or additionally, the loading table is able to move vertically either independently of or in coordination with the gantry.

Aspect 1 concerns an automated guided vehicle (AGV), a loading table on the AGV configured and sized to hold more than one storage container, a frame extending from the AGV, and a robotic arm mounted to the frame.

Aspect 2 concerns any of the preceding aspects, wherein the frame includes a gantry to which the robotic arm is mounted.

Aspect 3 concerns any of the preceding aspects, wherein the gantry is configured to move relative to the loading table.

Aspect 4 concerns any of the preceding aspects, further comprising at least a pair of rails disposed on opposing sides of the loading table, wherein the gantry includes at least a pair of legs movably mounted to the rails, and a robot support beam extending between the legs to which the robotic arm is mounted.

Aspect 5 concerns any of the preceding aspects, further comprising a gantry drive system configured to move the gantry along the rails.

Aspect 6 concerns any of the preceding aspects, wherein the gantry drive system includes a drive motor mounted to the AGV, a gearbox operatively connected to the drive motor, a drive belt operatively connected to the gearbox, and wherein at least one of the legs is secured to the drive belt.

Aspect 7 concerns any of the preceding aspects, wherein the loading table includes one or more conveyors configured to move the storage containers.

Aspect 8 concerns any of the preceding aspects, wherein the gantry facilitates at least seven degrees of motion of the robotic arm.

Aspect 9 concerns any of the preceding aspects, further comprising a sensor mast extending from the gantry, and a sensor system mounted to an end of the sensor mast to sense activity around the storage containers.

Aspect 10 concerns any of the preceding aspects, wherein the AGV includes one or more omnidirectional wheels configured to move the AGV.

Aspect 11 concerns any of the preceding aspects, wherein the AGV includes one or more inductive pickups to wirelessly charge the AGV.

Aspect 12 concerns any of the preceding aspects, wherein the robotic arm is configured to move in a vertical and/or horizontal direction relative to the frame.

Aspect 13 concerns any of the preceding aspects, wherein the loading table is configured to move in a vertical direction along the frame.

Aspect 14 concerns any of the preceding aspects, wherein the robotic arm includes an end of arm tool (EoAT) configured to handle one or more items at the same time.

Aspect 15 concerns any of the preceding aspects, wherein the EoAT includes more than one suction pad.

Aspect 16 concerns any of the preceding aspects, further comprising a vision system configured to guide movement of the robotic arm.

Aspect 17 concerns any of the preceding aspects, further comprising a stabilizer bar coupled to the frame.

Aspect 18 concerns any of the preceding aspects, further comprising a storage station having more than one level.

Aspect 19 concerns a method of moving an automated guided vehicle (AGV) to a storage station, wherein the AGV includes a loading table upon which containers are supported, and a robotic arm coupled to a gantry that locates the robotic arm above the containers, and transporting items with the robotic arm between the storage station and the containers.

Aspect 20 concerns any of the preceding aspects, wherein said transporting the items includes picking the items from the station with the robotic arm, and placing the items into the containers with the robotic arm.

Aspect 21 concerns any of the preceding aspects, wherein said transporting the items includes picking the items from the containers with the robotic arm, and placing the items into the storage station with the robotic arm.

Aspect 22 concerns any of the preceding aspects, further comprising moving the AGV to a second storage station, and transporting second items with the robotic arm between the second storage station and the containers.

Aspect 23 concerns any of the preceding aspects, further comprising repositioning the robotic arm by moving the gantry relative to the loading table on the AGV.

Aspect 24 concerns any of the preceding aspects, further comprising moving the robotic arm relative to the gantry.

Aspect 25 concerns any of the preceding aspects, further comprising wherein the loading table includes a conveyor, and unloading the containers from the AGV with the conveyor.

Aspect 26 concerns any of the preceding aspects, further comprising moving the containers in a vertical direction by moving the loading table in the vertical direction.

Aspect 27 concerns any of the preceding aspects, wherein the robotic arm includes an end of arm tool with separate suction pads, and said transporting the items includes picking the items at the same time with the separate suction pads.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
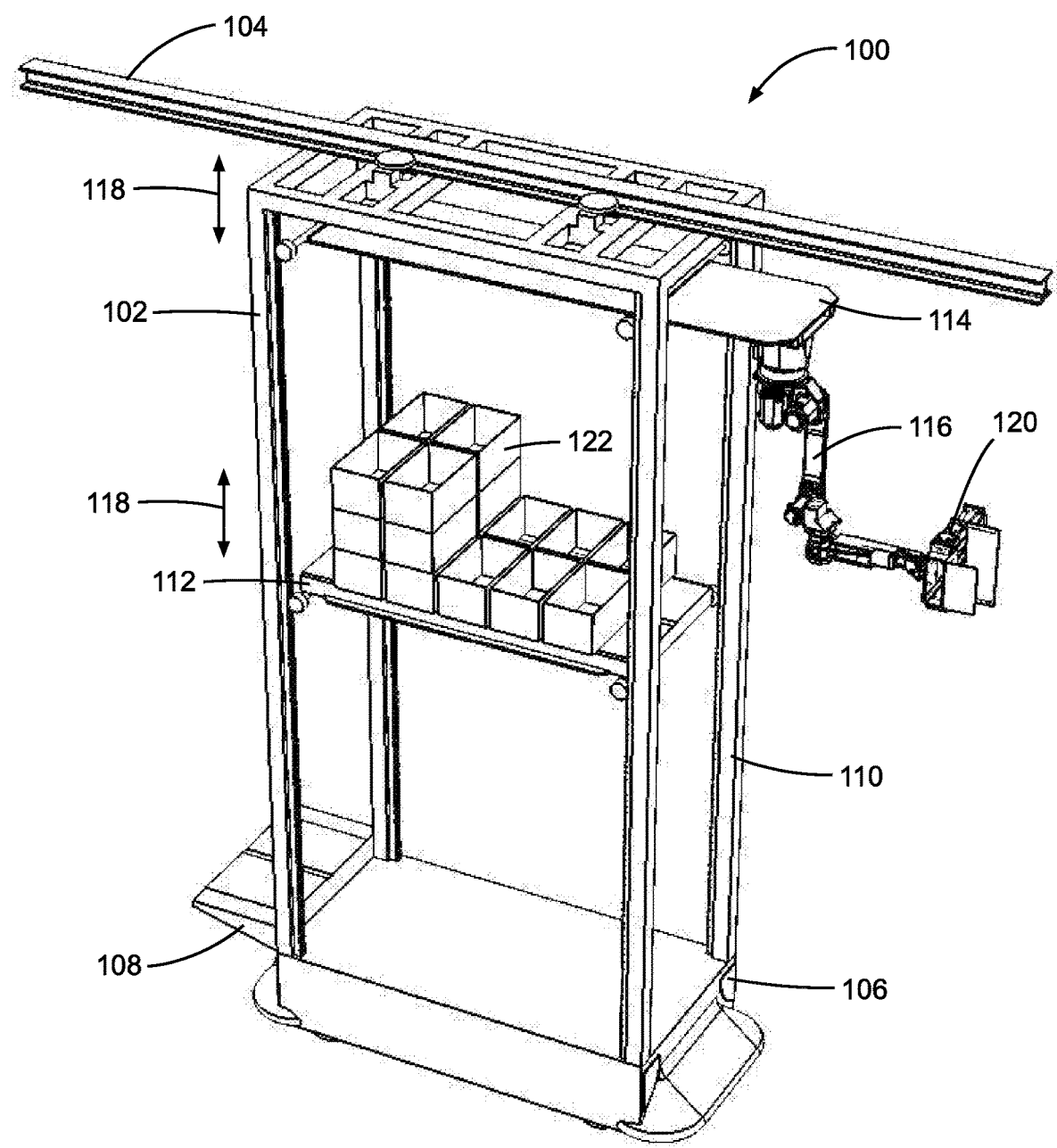
FIG. 1 is a front perspective view of one example of an AGV system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

One example of an AGV system 100 will now be described with reference to FIGS. 1-10. As shown, the AGV system 100 includes an AGV 102 and a stabilizer bar 104 that stabilizes the AGV 102 during operation, but the AGV 102 in other examples is configured to operate without the use of the stabilizer bar 104. The AGV 102 includes a drive system 106 configured to move and navigate the AGV 102. As shown, a transfer system 108 is configured to load and unload objects, such as totes, boxes, storage containers, SKUs, and/or other items, to and from the AGV 102. The AGV 102 further includes a frame 110 upon which a loading table 112 and a gantry 114 with a robotic arm 116 are able to move in a vertical direction, as is indicated by double arrows 118 in FIG. 1. The robotic arm 116 includes an end of arm tool (EoAT) 120 that is configured to grip or otherwise engage with objects in the environment, such as SKUs in the form of totes 122 positioned on the loading table 112. The EoAT 120 on the robotic arm 116 is configured to grip the totes 122 so as to load, unload, and/or reposition the totes 122 on the loading table 112. The robotic arm 116 further includes sensors, such as a vision system, that facilitate movement and interaction with objects.

Figure 2:
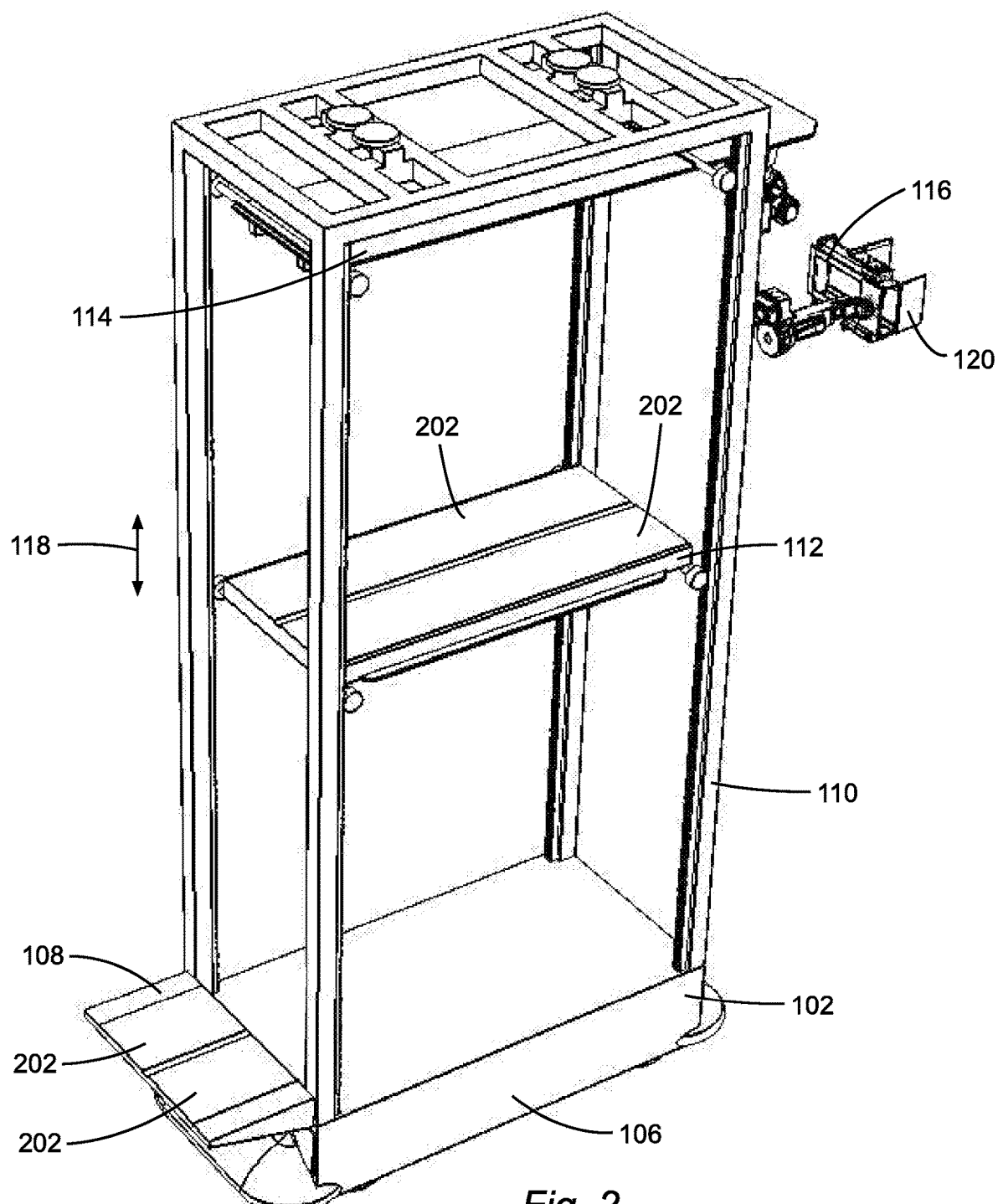
FIG. 2 is a rear perspective view of the AGV shown in the FIG. 1 system.
Figure 3:
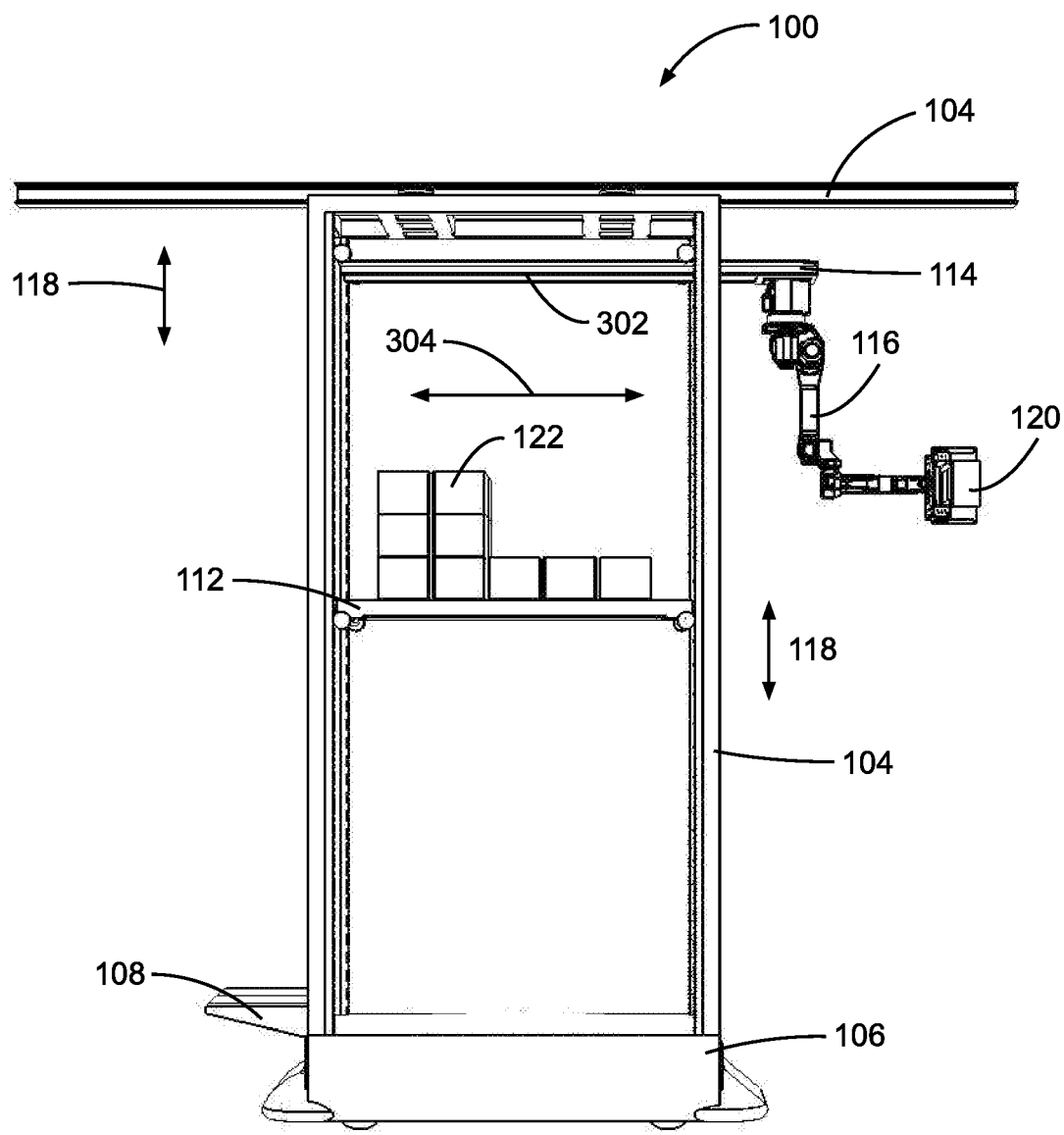
FIG. 3 is a left side view of the FIG. 1 AGV system.
Figure 4:
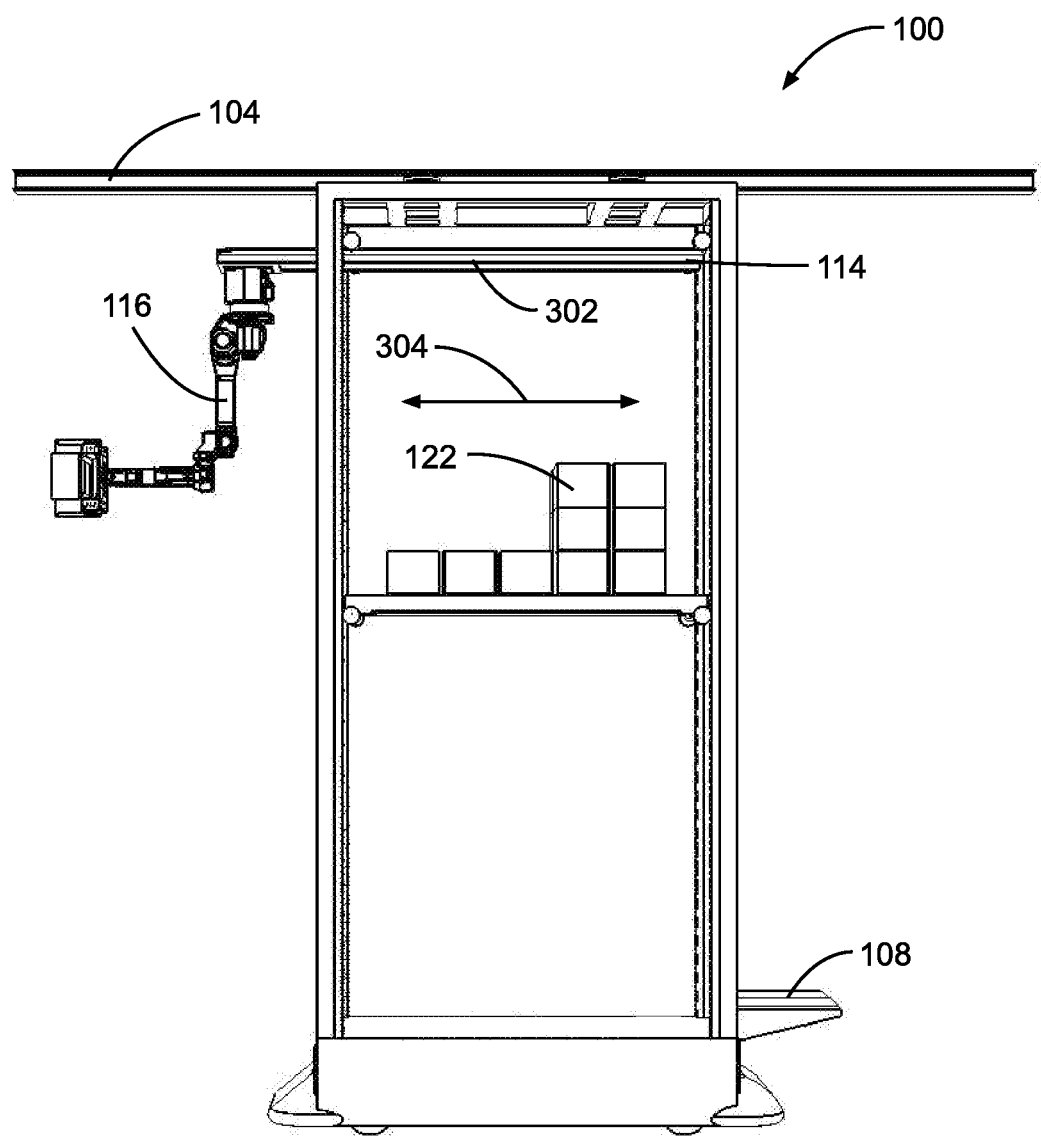
FIG. 4 is a right side view of the FIG. 1 AGV system.
Figure 5:
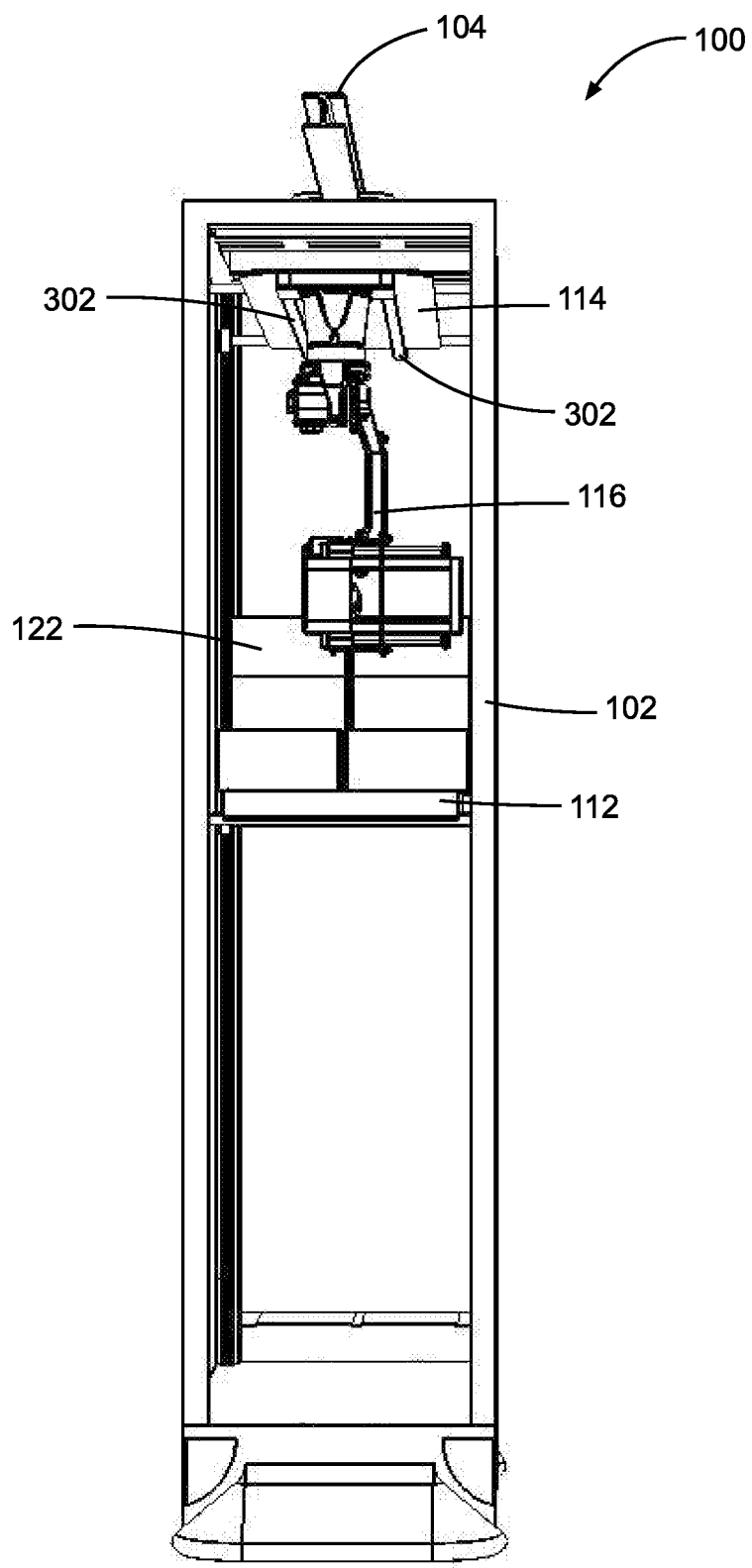
FIG. 5 is a front view of the FIG. 1 AGV system.
Figure 6:
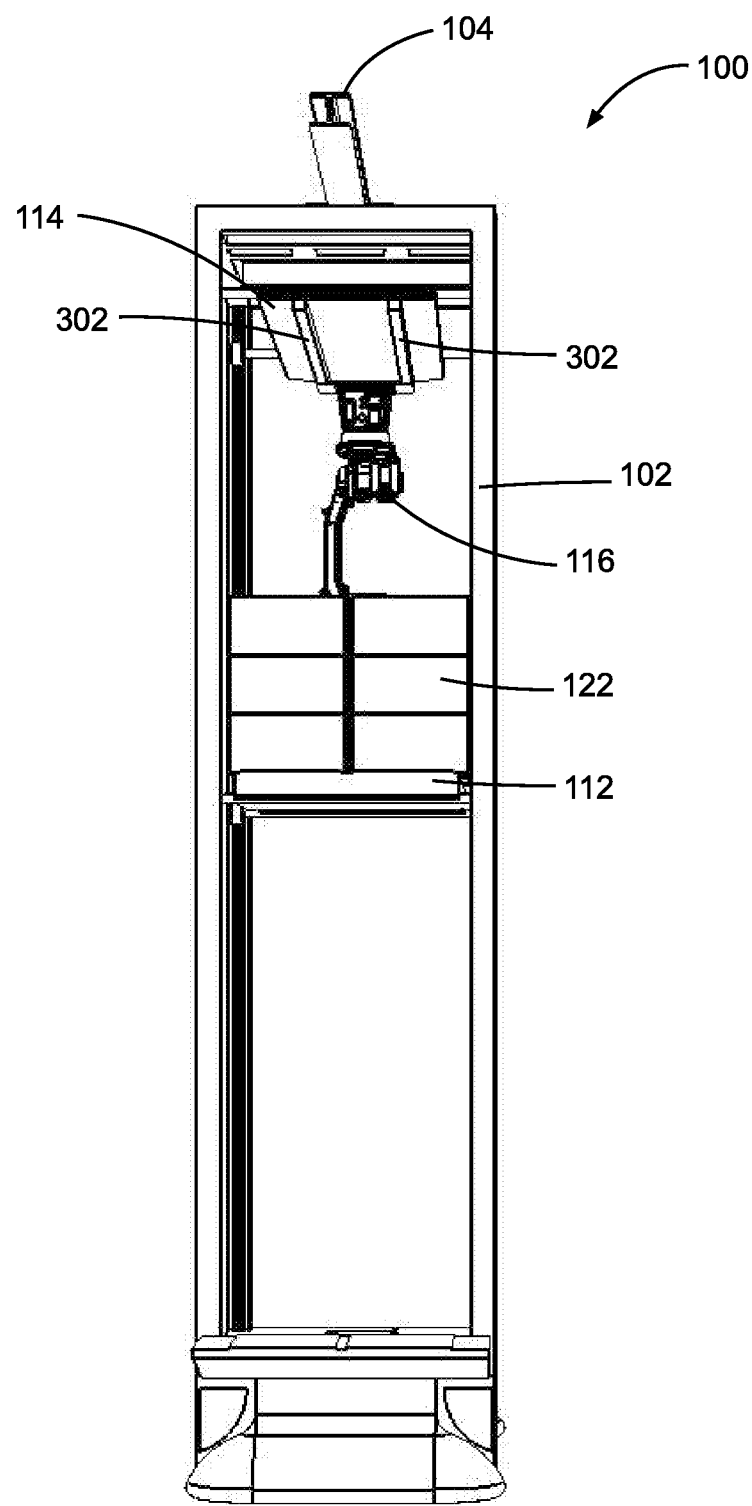
FIG. 6 is a rear view of the FIG. 1 AGV system.

Turning to FIG. 2, the transfer system 108 along with the loading table 112 each include one or more conveyors 202. The conveyors 202 are configured to load and/or unload SKUs to and/or from the loading table 112, such as to and/or from another station, conveyor, truck, palletizer, etc. The table 112 is sized and configured to allow the AGV 102 to handle multiple different types and/or batches of SKUs at the same time. This ability of the AGV 102 to batch process the SKUs allows the AGV system 100 to efficiently handle SKUs in "Fast Eaches" and "Medium Eaches" conditions which in turn reduces or even eliminates the need for manual handling. In the illustrated example, the conveyors 202 are belt type conveyors that are positioned in a side-by-side fashion. When the table 112 is lowered to the level of the transfer system 108, the pair of conveyors 202 on the table 112 are aligned with the pair of conveyors 202 on the transfer system 108. The pairs of conveyors 202 in one form are independently controllable to provide greater flexibility for reorienting and/or rearranging SKUs, such as the totes 122, on the table 112 and/or the transfer system 108. For example, the totes 122 can be arranged in columns aligned with the conveyors 202 such that the column of totes 122 can be independently repositioned in order to reduce travel time of the robotic arm 116. The robotic arm 116 can also reposition and stack the totes 122 in these columns. In the illustrated example, the transfer system 108 and table 112 each includes two belt conveyors located in a side-by-side arrangement, but the transfer system 108 and table 112 in other examples can be configured differently (e.g., include one or more than two conveyors, arranged differently, etc.) and/or include other or different types of conveyors or transferring mechanisms.

Referring to FIGS. 3, 4, 5, and 6, the loading table 112 and the gantry 114 are able to move in the vertical direction independently of one another, as is indicated by double arrows 118. This allows for the relative vertical adjustment between the robotic arm 116 and the loading table 112 to accommodate various conditions. For instance, this relative adjustment allows the robotic arm 116 to efficiently service stations at various vertical levels, even on or close to the floor, by placing the table 112 and the robotic arm 116 in close relation to the vertical level being serviced. This relative adjustment allows the system 100 to compensate for changes in SKU heights, such as caused by stacking of the totes 122 and/or totes 122 having varying heights or dimensions.

The gantry 114 includes one or more rails 302 upon which the robotic arm 116 moves in a horizontal direction, as is indicated by double arrow 304. With the robotic arm 116 able to move horizontally by hanging from the rails 302 of the gantry 114, the robotic arm 116 is able to rapidly service the entire table 112 without disturbing the multiple SKUs on the table 112. The rails 302 of the gantry 114 further allow the robotic arm 116 to service stations at various orientations or locations relative to the AGV 102 (e.g., at the sides and back of the AGV) Processing can be further accelerated by coordinating the movement of the conveyors 202 on the table 112 with the robotic arm 116. For example, open spaces on the conveyors 202 can be moved into close proximity to the station being serviced so that the robotic arm 116 has a short travel distance and/or time. In the illustrated example, the gantry 114 has two rails 302, but in other examples, the gantry 114 can have a single rail 302 or more than two rails 302.

Figure 7:
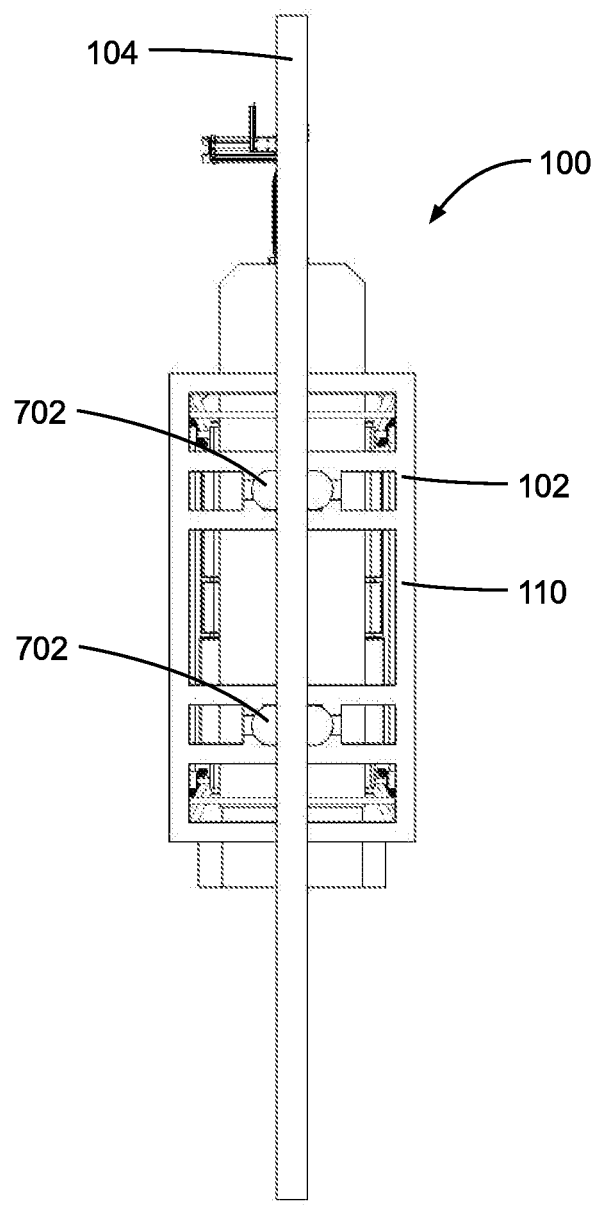
FIG. 7 is a top view of the FIG. 1 AGV system.
Figure 8:
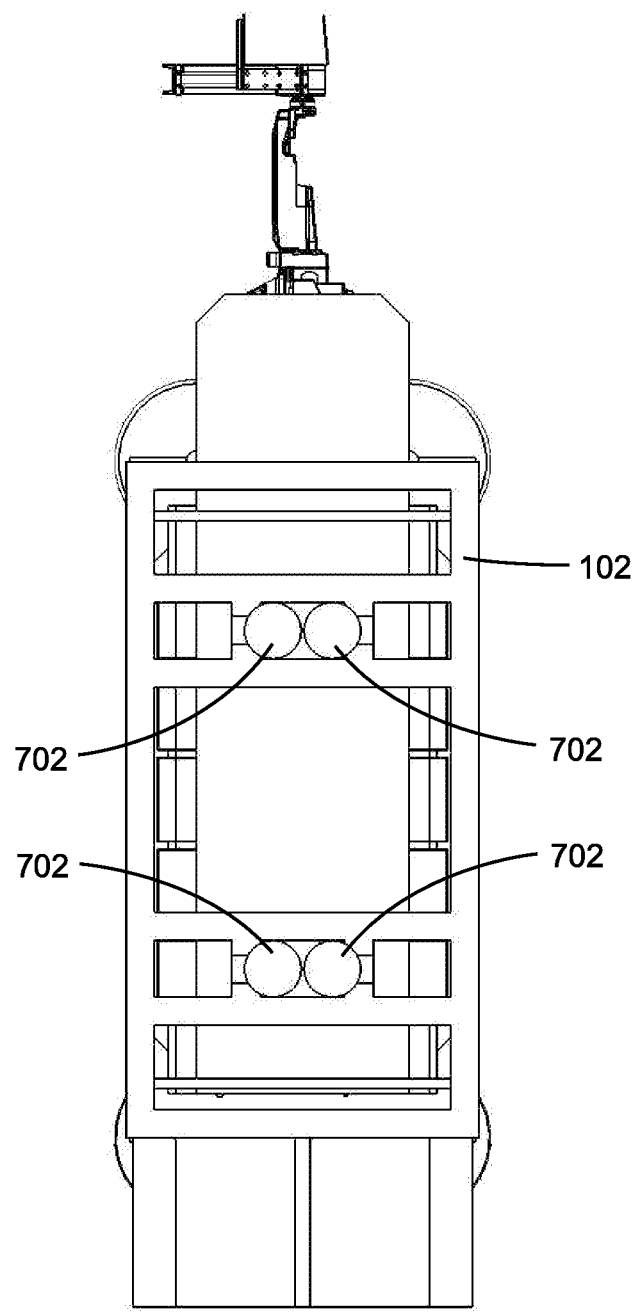
FIG. 8 is a top view of the FIG. 2 AGV without a stabilizer bar.

Looking at FIGS. 7 and 8, the frame 110 of the AGV 102 has one or more guide wheels 702 positioned to engage the stabilizer bar 104. In the illustrated example, the frame 110 has two pairs of guide wheels 702 positioned on opposite sides of the stabilizer bar 104 to minimize the risk of the AGV from tipping over. The AGV 102 can be in constant engagement with the stabilizer bar 104 or intermittently in contact with the stabilizer bar 104. For instance, the stabilizer bar 104 can be engaged by the guide wheels 702 when the AGV 102 is positioned in close proximity to a station where SKUs are loaded and/or unloaded by the robotic arm 116 to prevent tipping, but when the AGV 102 leaves the station, the AGV 102 disengages from the stabilizer bar 104. Alternatively, the AGV 102 can be designed to have a lower center of gravity to eliminate the need for the stabilizer bar 104 and/or guide wheels 702 altogether.

Figure 9:
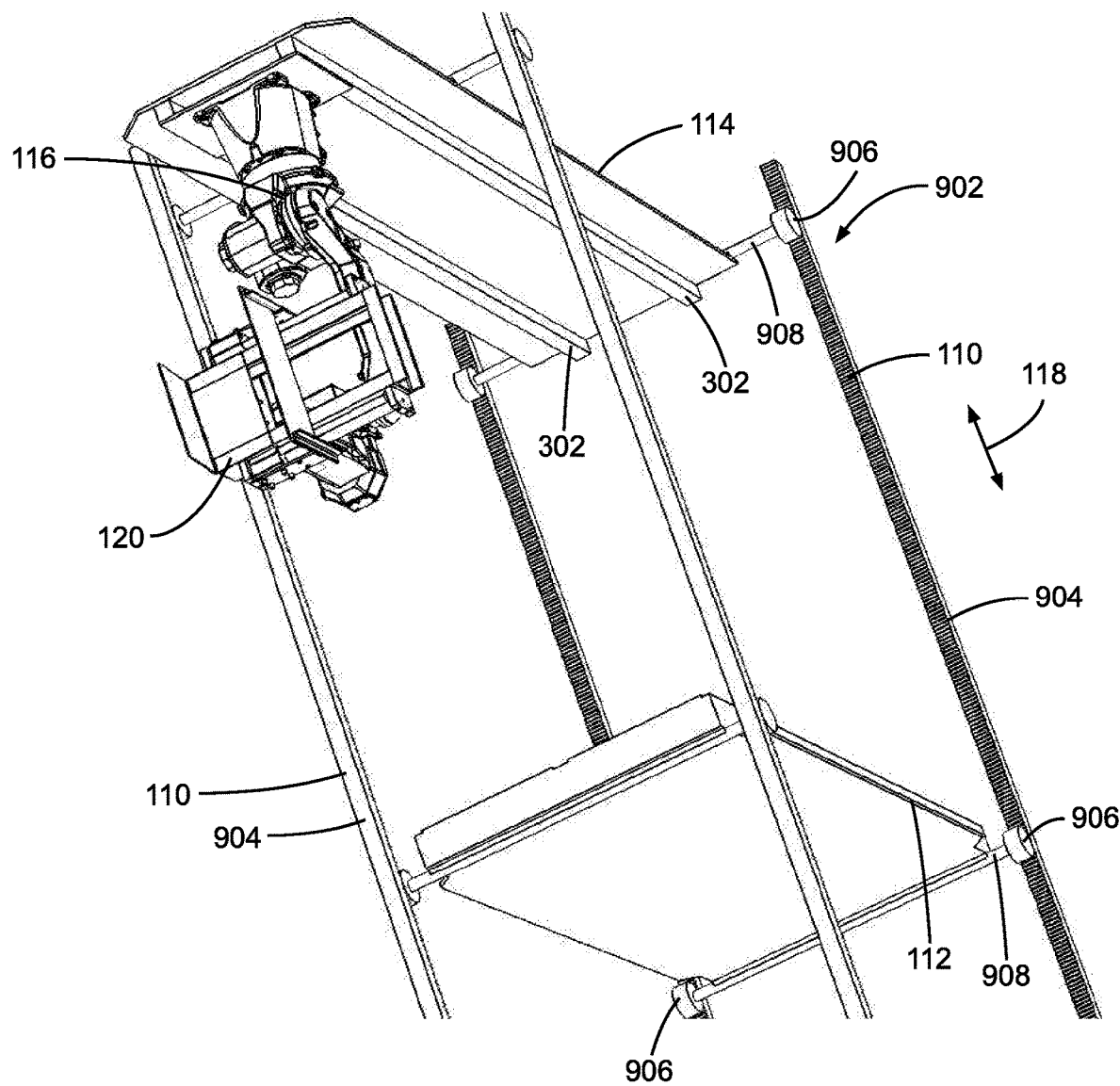
FIG. 9 is a partial perspective view of a vertical positioning system used in the FIG. 2 AGV.

As noted before, the AGV 102 in FIG. 9 includes a vertical transport system 902 that allows the loading table 112 and the gantry 114 to move in the vertical direction 118 (i.e., raise or lower). In the illustrated example, the vertical transport system 902 includes one or more racks 904 on the frame 110 and pinions or gears 906 engaging the racks 904. The pinions 906 are coupled to the table 112 and gantry 114 via one or more drive shafts 908 configured to rotate the pinions 906, as is depicted in FIG. 9. The drive shafts 908 can be powered in any number of manners, such as electrically, pneumatically, and/or hydraulically. In one example, electric motors in the drive shafts 908 are used to provide power to the pinions 906 so that loading table 112 and gantry 114 can move up and along the frame 110. It should be recognized that the vertical transport system 902 can be configured differently in other examples. For example, the vertical transport system 902 can include hydraulic pistons and/or cables to move the loading table 112 and gantry 114 in a fashion similar to elevators.

Figure 10:
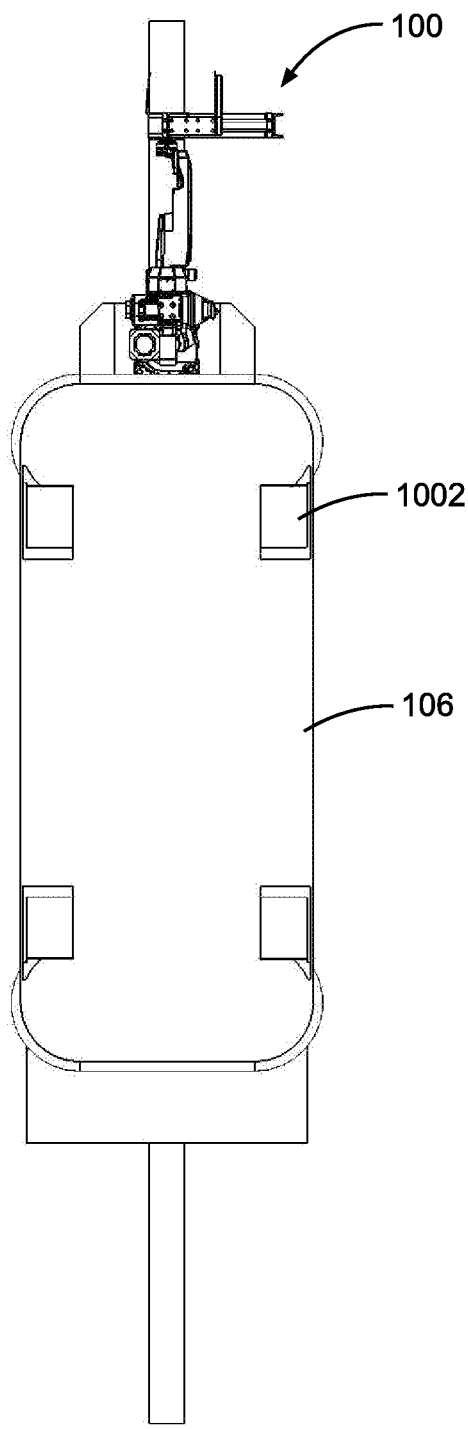
FIG. 10 is a bottom view of the FIG. 1 AGV system.
Figure 11:
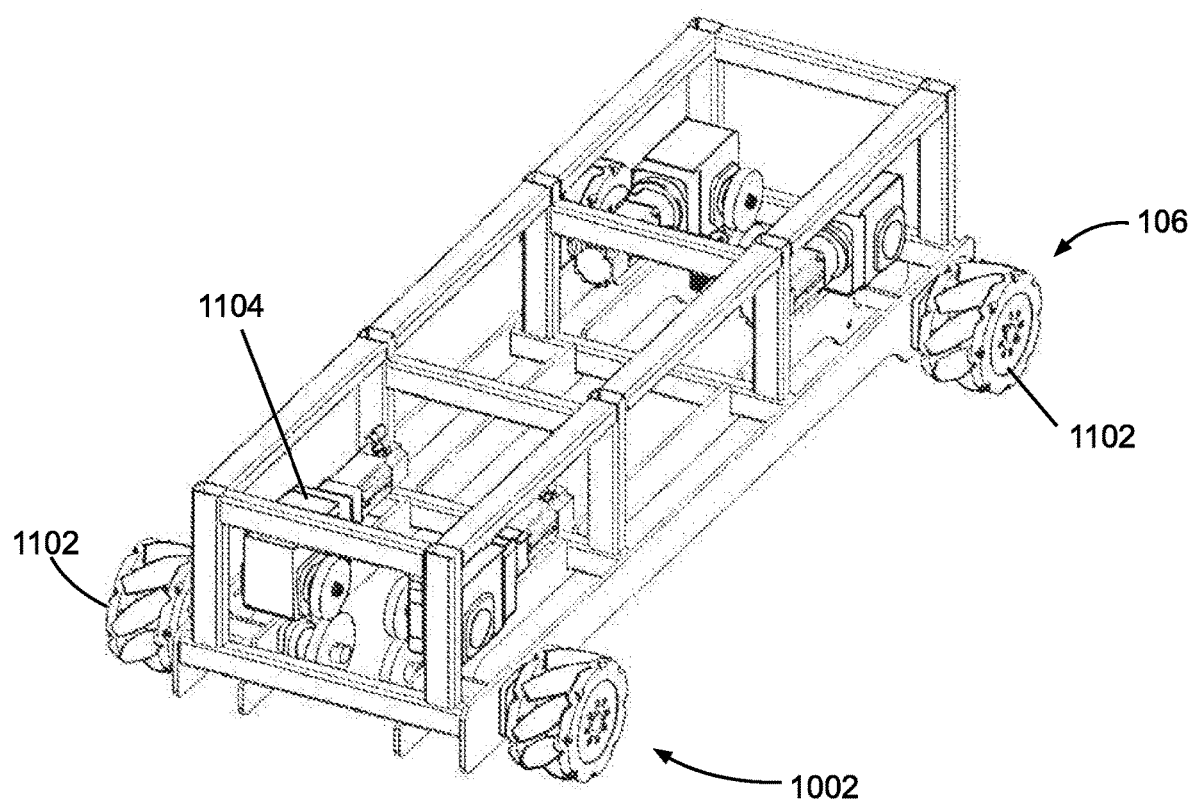
FIG. 11 is a perspective view of a drive system used in the FIG. 2 AGV.

Looking at FIGS. 10 and 11, the drive system 106 includes one or more propulsion mechanisms 1002 for moving the AGV along the floor or ground. In the illustrated example, the propulsion mechanism 1002 includes wheels, but it should be recognized that the propulsion mechanism can come in other forms, such as a continuous track, mag-lev, bearings, and the like. Turning to FIG. 11, the propulsion system 1002 includes one or more omnidirectional wheels 1102 that allow the drive system 106 to not only move forwards and backwards but also laterally and rotationally. In one form, the omnidirectional wheels 1102 are Mecanum type wheels, but the wheels 1102 can include other types of wheels in other examples. The omnidirectional wheels 1102 are individually driven via one or more drive motors 1104. In the illustrated example, the drive motors 1104 include electric motors, but other types of motors can be used, such as hydraulic or pneumatic motors.

The AGV system 100 is configured to process "Eaches" using a batch picking approach in which multiple SKU orders are processed at the same time. As mentioned before, the loading table 112 is sized and configured to hold multiple totes 122. This allows the AGV 102 to process multiple each orders at a single station without having to return to a main distribution station. This in turn eliminates wasted trips by the AGV 102 which in turn provides an efficient way for the AGV system 100 to process "Fast Eaches" and "Medium Eaches." As an example, during operation, the AGV 102 travels to a particular storage location or station in order to pick different types of SKUs, such as different snack bags, soft drink brands, produce, parts, and the like. The robotic arm 116 can pick the appropriate numbers of the different SKUs for each order at the station and place the SKUs on the loading table 112. For instance, totes 122 containing different items are loaded and stacked on the loading table 112, as is depicted in FIG. 1. The conveyors 202 of the loading table 112 along with the robotic arm 116 can rearrange the totes 122 in order to promote efficient picking. It also should be recognized that the AGV 102 can be used to replenish SKUs at the storage stations. Once all of the appropriate SKUs are picked, the AGV 102 travels to the next station to pick additional SKUs for the orders. Once some or all of the orders are fulfilled, the AGV 102 can travel to the distribution station, such as a conveyor line, palletizer, or packaging line, and the totes 122 can be unloaded for further processing or loading onto a truck for transportation. To unload the totes 122, the loading table 112 is lowered so as to align with the transfer system 108. The conveyors 202 on the transfer system 108 and loading table 112 are powered to unload the totes 122 from the AGV 102 and/or load new totes onto the loading table 112 so that the AGV is able to replenish SKUs if so desired.

Another example of an AGV system 1200 will now be described with reference to FIGS. 12-23. As should recognized that the AGV system 1200 shares a number of features in common with the AGV system 100 described with reference to FIG. 1, such as the stabilizer bar 104, and for the sake of clarity and brevity, the common features will not be again described in great detail but please refer to the description provided above. The AGV system 1200 includes an AGV 1202 configured to load and/or unload (i.e., pick and/or put) SKUs from a station 1204. In the illustrated example, the station 1204 includes a two level rack system with slides and donor totes, but it should be recognized that the station 1204 can be configured differently in other examples.

Figure 18:
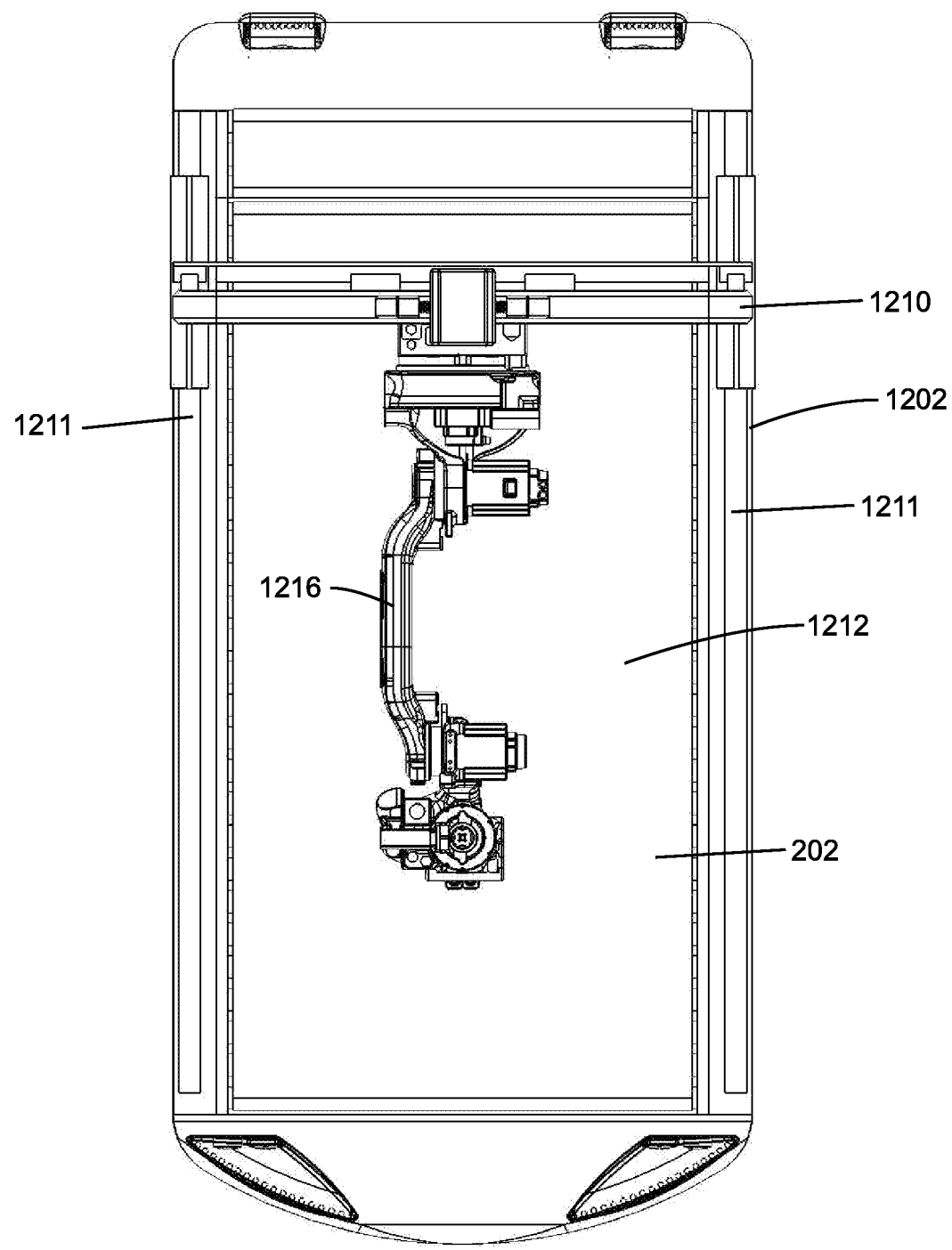
FIG. 18 is a top view of the FIG. 12 AGV.
Figure 19:
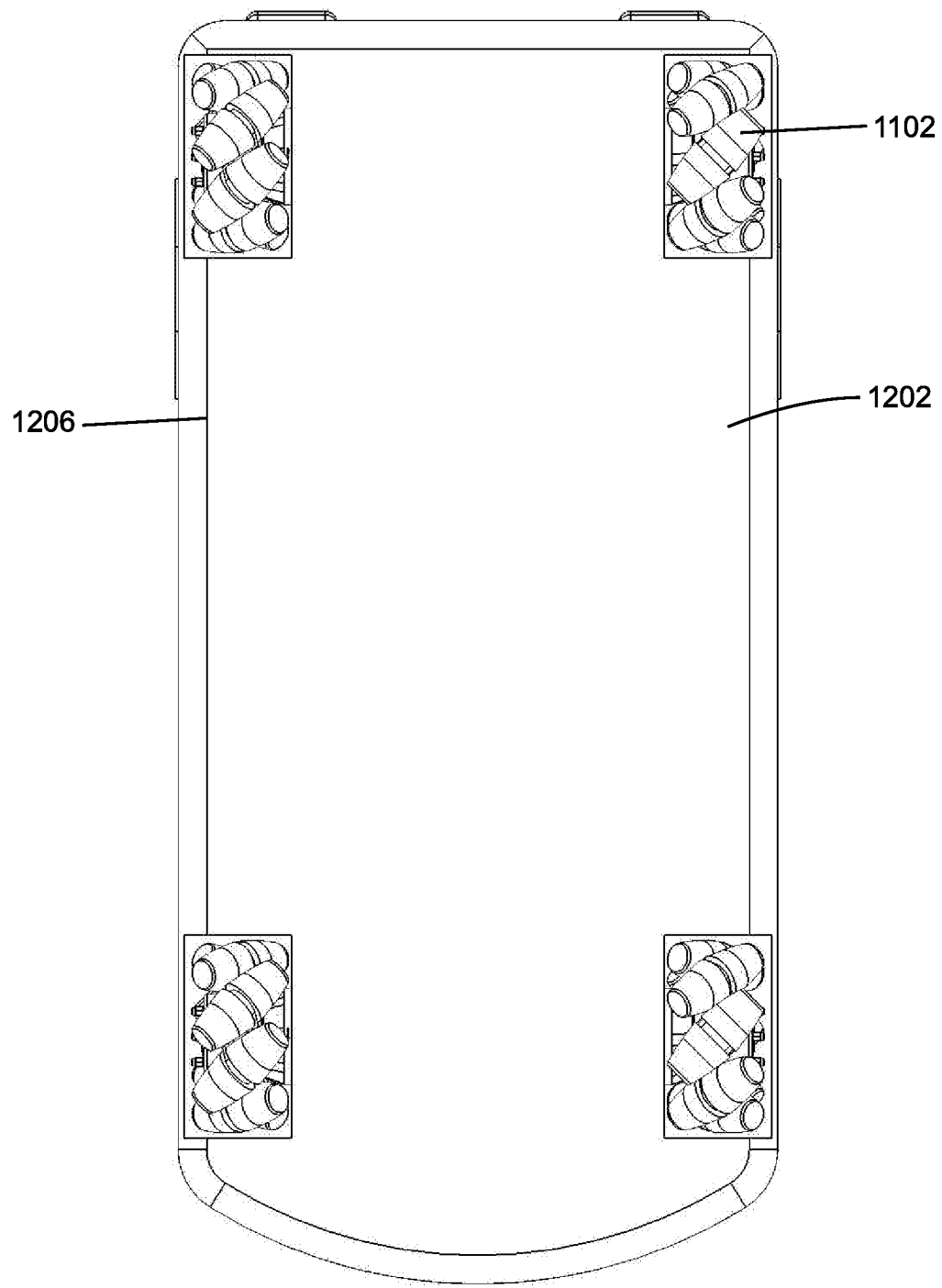
FIG. 19 is a bottom view of the FIG. 12 AGV.

Turning to FIGS. 12, 13, 14, 15, 16, and 17, the AGV 1202 includes a drive system 1206 with omnidirectional wheels 1102 for moving the AGV 1202 and one or more navigation sensors 1208 that aid in navigating the AGV 1202 as well as help avoid obstacles. In one form, the navigation sensors 1208 include laser type sensing systems such that the AGV 1202 is laser directed. A frame 1210 is mounted to a loading table or platform 1212 of the AGV 1202. In the illustrated example, the frame 1210 is mounted on one or more rails 1211 that allow the frame 1210 to move relative to the drive system 1206. As shown in FIG. 18, the rails 1211 generally extend on opposing sides for the length of the drive system 1206 so that the frame 1210 is able to move generally along the entire length of the AGV 1202. In other examples, the frame 1210 is attached at a fixed position along the drive system 1206. The loading table 1212 is configured to carry multiple items, such as SKUs or totes 122, at the same time. In one form, the table 1212 is able to store and move twelve (12) work-in-progress (WIP) "Put" order storage containers or totes 122. The loading table 1212 includes a vertical transport or lift mechanism 1213 that allows the loading table 1212 to be raised or lowered relative to the drive system 1206. The lift mechanism 1213 can include hydraulic, pneumatic, and/or electric type lifts. As can be seen in FIG. 18, the loading table 1212 includes a single conveyor 202, which is in the form of a belt type conveyor, for moving the totes 122, such as for loading, unloading, and/or reorientation. The loading table 1212 can be configured differently. For instance, the loading table 1212 can be just a flat surface, can include multiple conveyors 202 of the type described above, and/or can be moveable relative to the rest of the AGV 1202 so as to move or reorient objects on the table 1212.

The frame 1210 supports a gantry 1214 with one or more beams 1215 from where a robotic arm 1216 hangs. As indicated by double arrow 1218 in FIGS. 12 and 13, the robotic arm 1216 is able to move laterally along the gantry 1214. The gantry 1214 in the illustrated example includes two beams 1215 along which the robotic arm 1216 moves, but it should be recognized that the gantry 1214 can include more or less beams 1215 and/or be configured differently in other examples. The gantry 1214 is also able move vertically along one or more rails 1219 that extend vertically along the frame 1210. With this ability of the gantry 1214 to move vertically along the rails 1219, the robotic arm 1216 is able to move vertically so as to be able to service different storage location levels efficiently. The robotic arm 1216 includes an EoAT 1220 that has one or more suction cups 1222. In the illustrated example, the EoAT 1220 includes a series of the suction cups 1222 arranged in columns. The suction cups 1222 are able to be individually activated to create a vacuum (low pressure) so that the EoAT 1222 is able to pick up one or more objects separately or together. In one particular form, the EoAT 1222 via the suction cups 1222 is able to pick up and release simultaneously anywhere from one (1) to four (4) bags, such as those used for snacks and/chips. In one variation, the robotic arm 1216 includes a six (6) axis robot with the EoAT 1220 capable of picking and putting from one to four (4) bags per pick cycle. This ability to pick up multiple SKUs at the same time increases picking (or putting) speed and efficiency because the robotic arm 1216 requires less reaching motions. The AGV 1202 further includes a vision system 1224 configured to help identify and locate objects, such as SKUs, totes, etc., that are handled by the robotic arm 1216 as well as provide guidance for the AGV 1202 and/or the robotic arm 1216.

Figure 20:
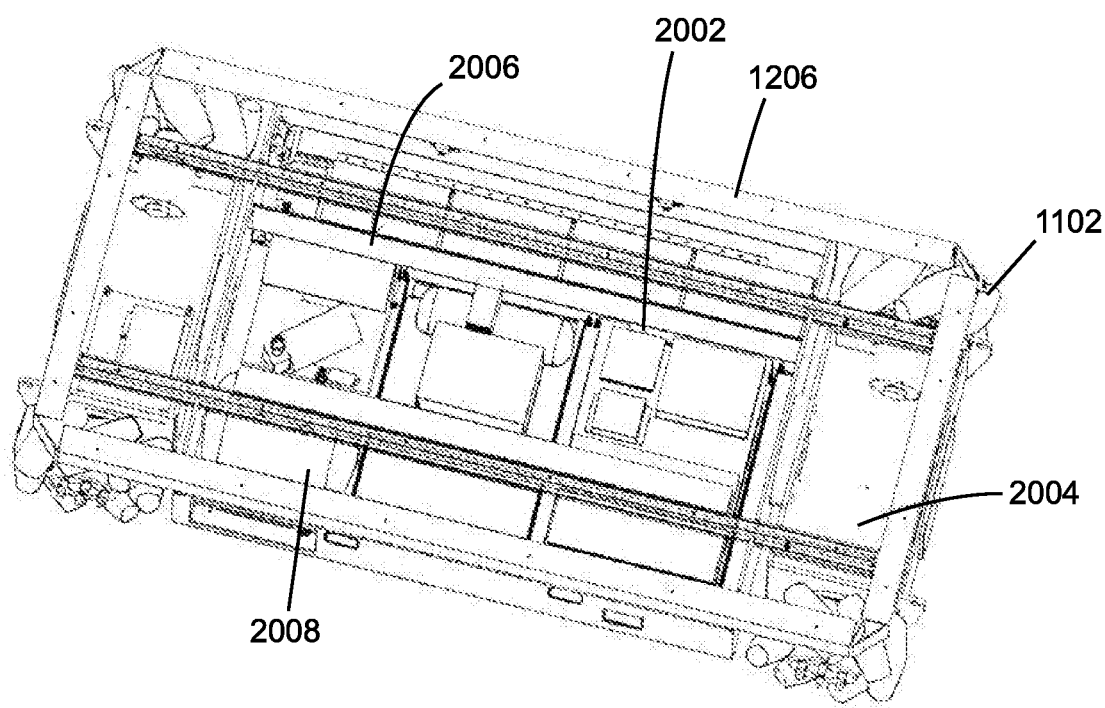
FIG. 20 is a perspective view of a drive system used in the FIG. 12 AGV.

FIG. 20 shows a perspective view of the drive system 1206 with the loading table 1212 removed. In addition to the omnidirectional wheels 1102 (FIG. 19), the drive system 1206 includes one or more controllers 2002 and drive motors 2004 that control and power the wheels 1102. The drive system further includes one or more batteries 2006 for powering the AGV 1202. A pneumatic tank 2008 can provide pneumatic power to various components of the AGV 1202, such as the robotic arm 1216.

In one example, the AGV 1202 is designed as light as possible with a low center of gravity. In certain examples, the drive system 1206 weighs in the 4000 pounds range, and the payload of the AGV 1202 for the loading table 1212 and the robotic arm 1216 weighs approximately 2000 pounds. In one form, one or more batteries, which operate for about 17 hours per day, are located inside the drive system 1206. Opportunity charging on a closed loop path for the AGV 1202 is used to recharge the batteries. In one example, the AGV 1202 is designed to accelerate up to 200 feet/minute. Other components housed inside the drive system 1206 include, but are not limited to, a power supply (e.g., a 24 Volt supply), an inverter, a robot, and vehicle controller (e.g., may be an integrated controller), an air compressor (if required), a vacuum pump, electric drives for the wheels, an industrial personal computer (PC), a connection for a wireless pendant, a wireless access point, and navigation/safety sensors. For instance, all drive system 1206 motion is controlled from a single PC or programmable logic controller (PLC) in one example, and the robotic arm 1216 motion is also controlled from the same PC or PLC, if so desired. Any vision processing or signal integration tasks run on the same PC, if possible. In one particular design, Robot Operating System (ROS) Navigation in conjunction with Sick NAV 350 sensors can be used. In specific designs, the area where the AGVs operate is fenced off so safety sensors for personnel interaction are not required.

Figure 21:
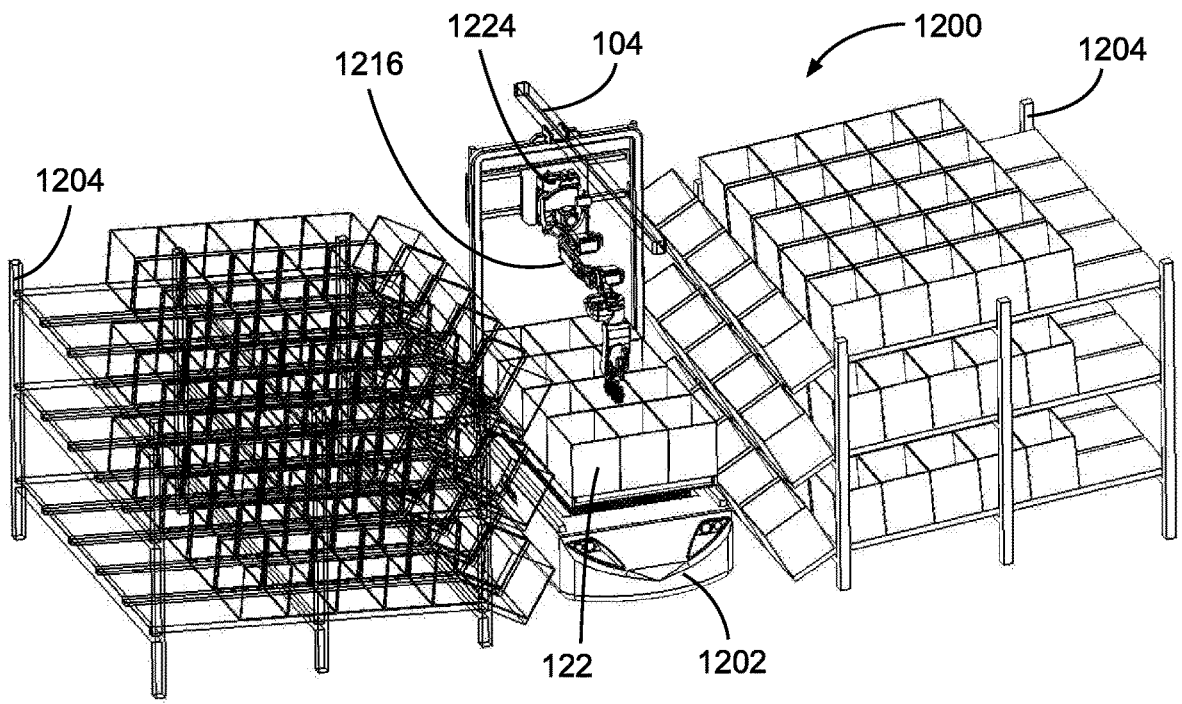
FIG. 21 is a perspective view of the FIG. 12 AGV moving along an aisle between opposing storage rack stations.
Figure 22:
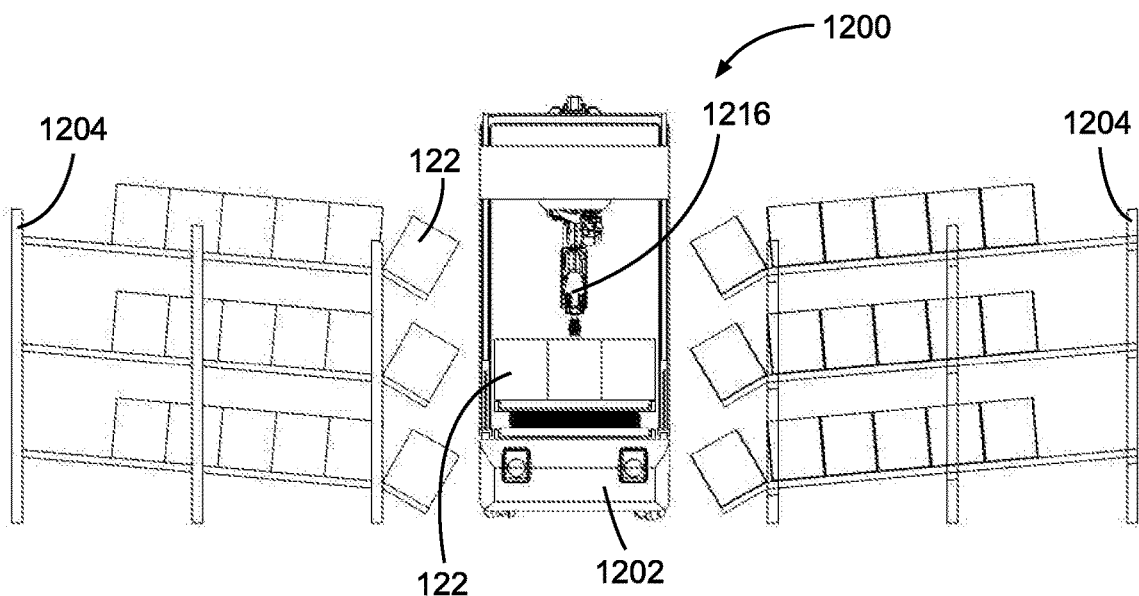
FIG. 22 is a rear view of the system shown in FIG. 21.
Figure 23:
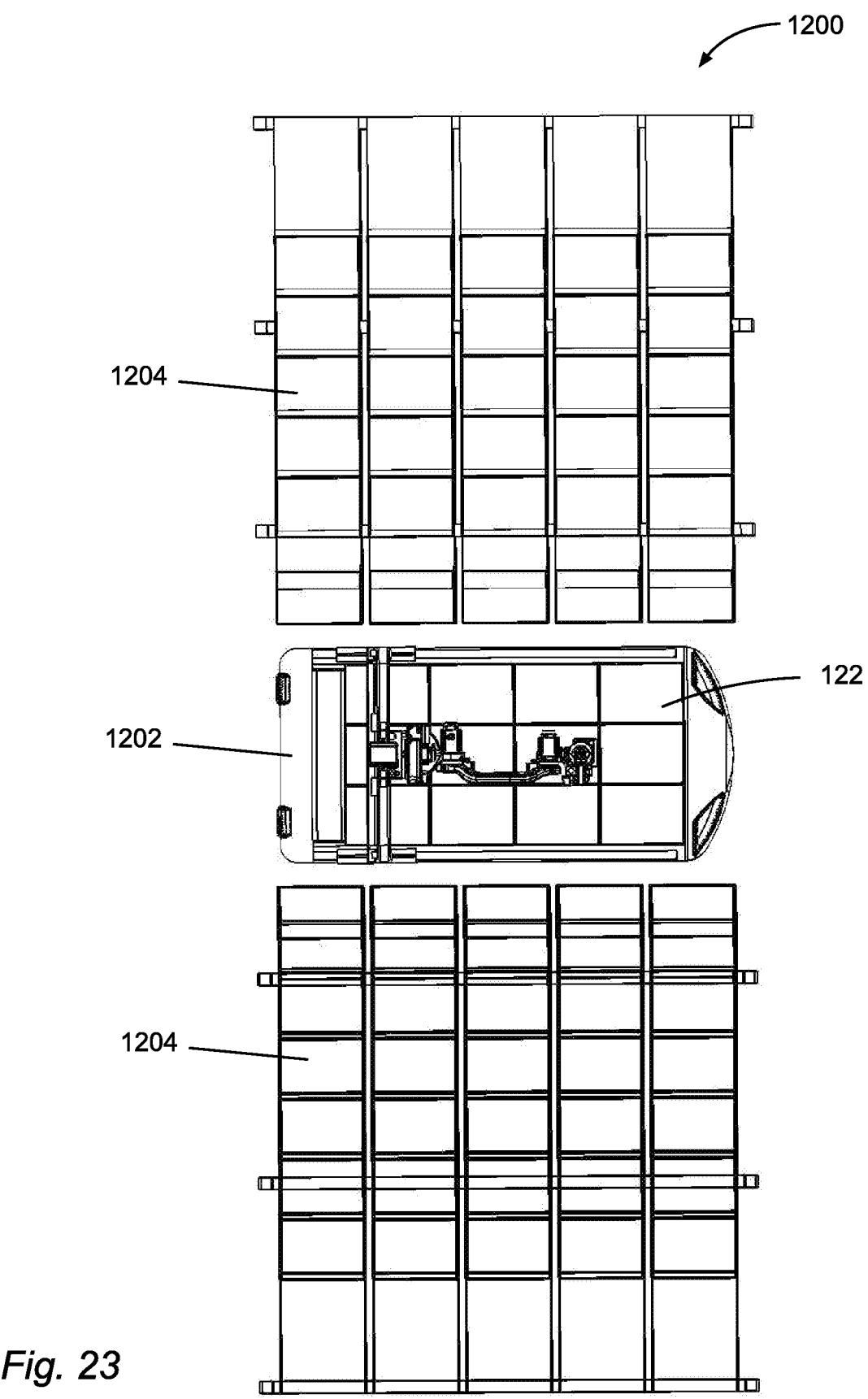
FIG. 23 is a top view of the system shown in FIG. 21.

FIGS. 21, 22, and 23 show one example of an environment in which the AGV 1202 is able to navigate. In the illustrated example, the AGV 1202 moves along an aisle located between opposing storage stations 1204. The robotic arm 1216 is then able to efficiently service the storage stations 1204 located on either side of the AGV 1202. The AGV 1202 can be navigated using a wide range of techniques. If precise navigation is required, the vision system 1224 can be used for moving the robotic arm 1216 as well as for navigating the AGV 1202. Alternatively or additionally, a magnetic strip on the floor can be used for navigation, such as down a carton flow cell aisle. The system 1200 includes a controller that coordinates the activities of multiple AGVs 1202 so as to avoid any collisions or interference. The system 1200 is designed to allow multiple AGVs 1202 to navigate in the same confined space, and cooperate as the AGVs 1202 process orders. In one example, the system 1200 is configured to allow up to eight (8) AGVs 1202 in the same loop to all navigate independently from each other while avoiding collisions, but the activities of more or less AGVs can be coordinated in other examples. In one form, the ROS Indigo on Ubuntu Linux (version 14.04) is used to control the robotic arm 1216 as well as other components of the AGV system 1200, but other types of software and/or firmware platforms can be used in other variations. In one example, each AGV 1202 communicates with a master controller station such as through a wireless network (e.g., using 802.11b/g, WiFi at 2.4 GHz, 802.11z Zigbee, etc.).

Figure 12:
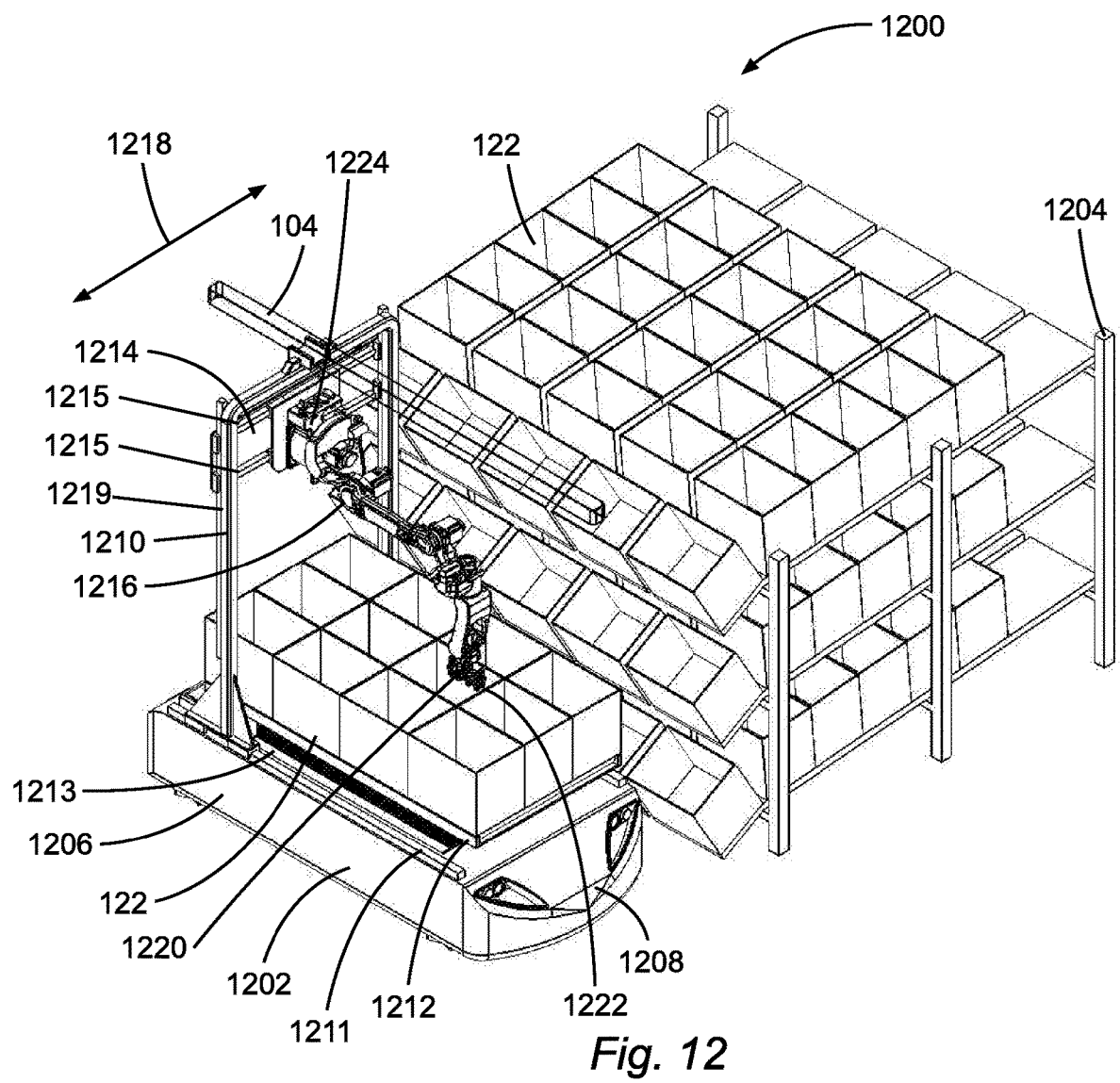
FIG. 12 is a perspective view of another example of an AGV positioned to service a station.
Figure 13:
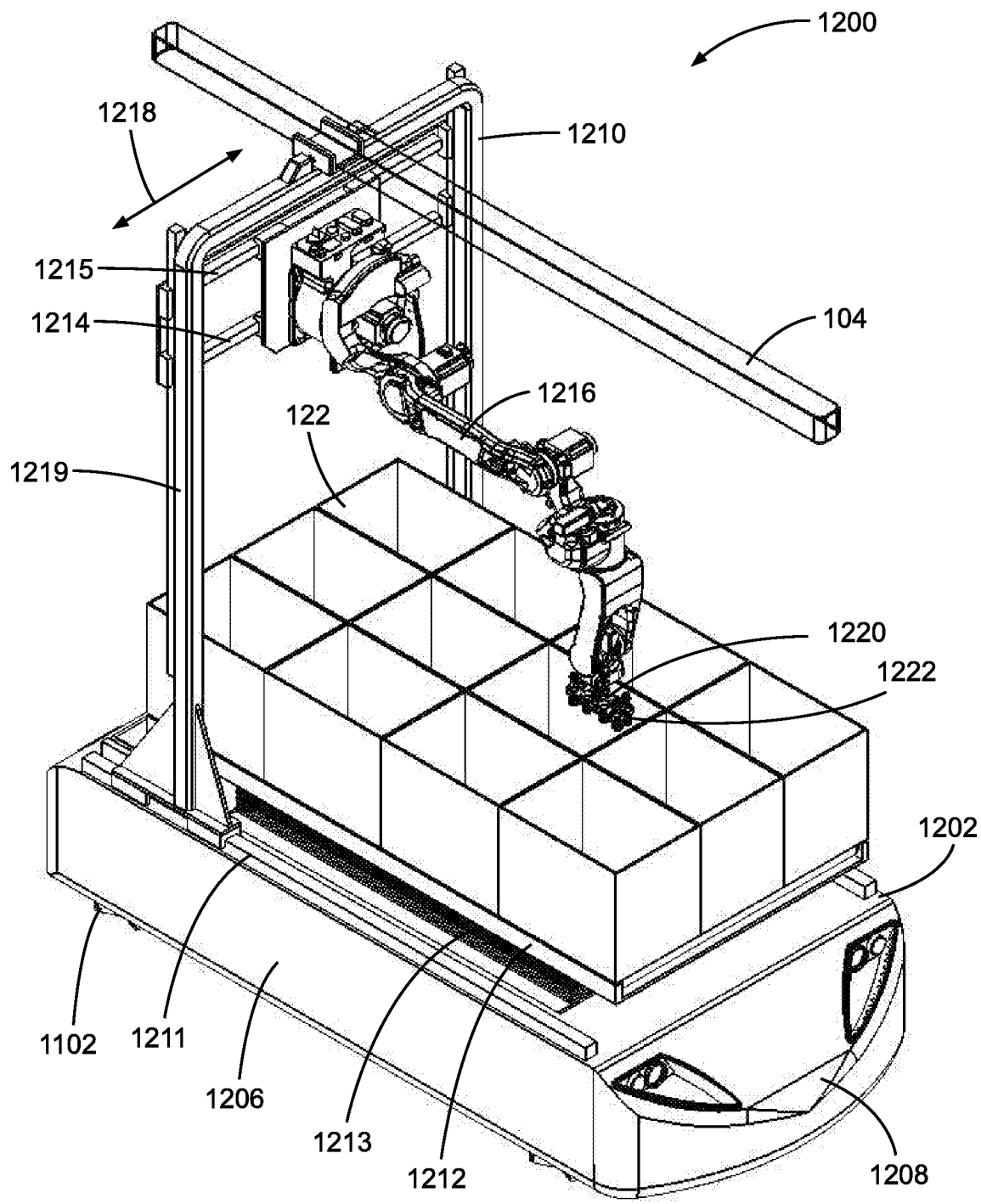
FIG. 13 is a perspective view of the FIG. 12 AGV.
Figure 14:
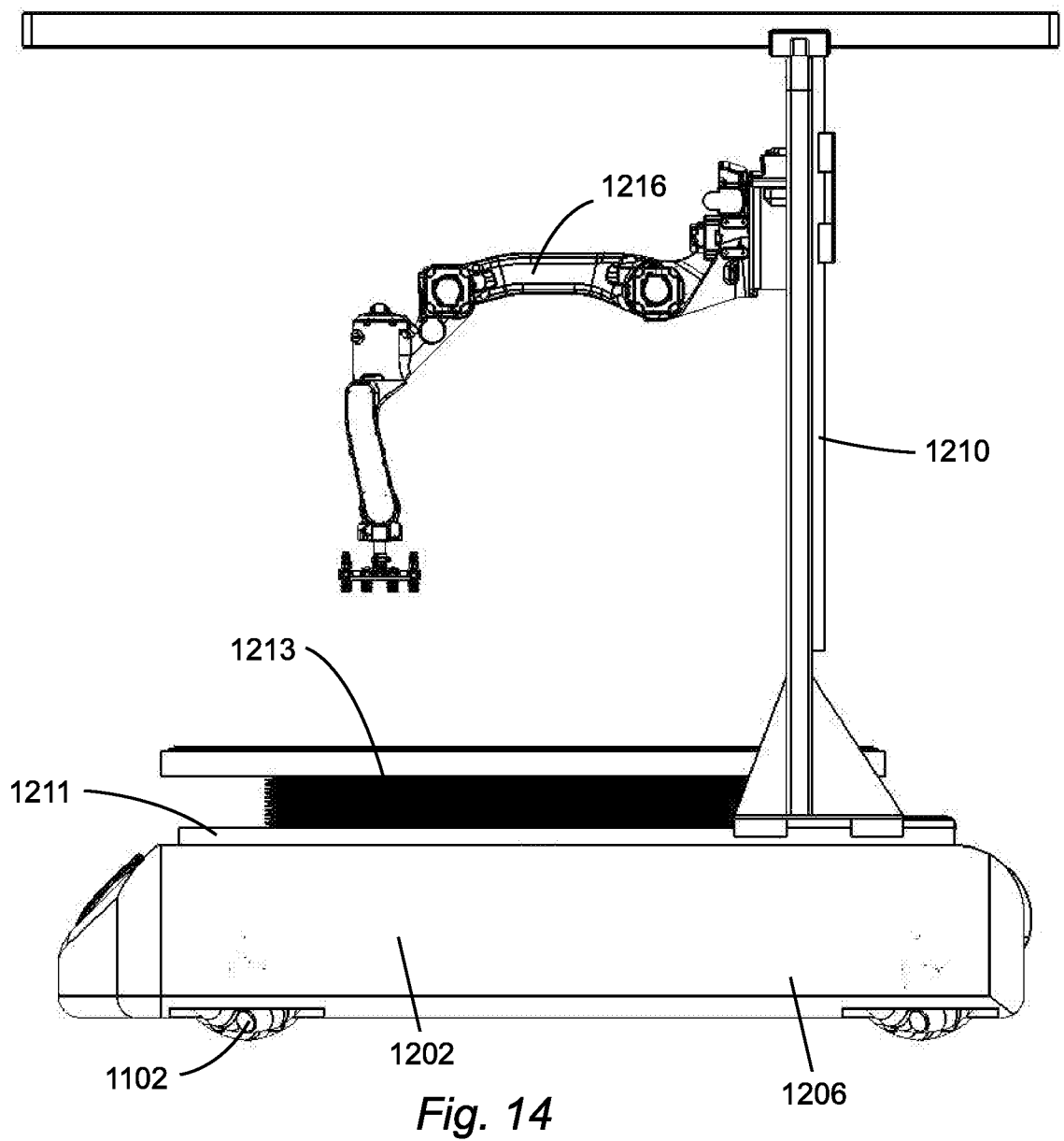
FIG. 14 is a left side view of the FIG. 12 AGV.
Figure 15:
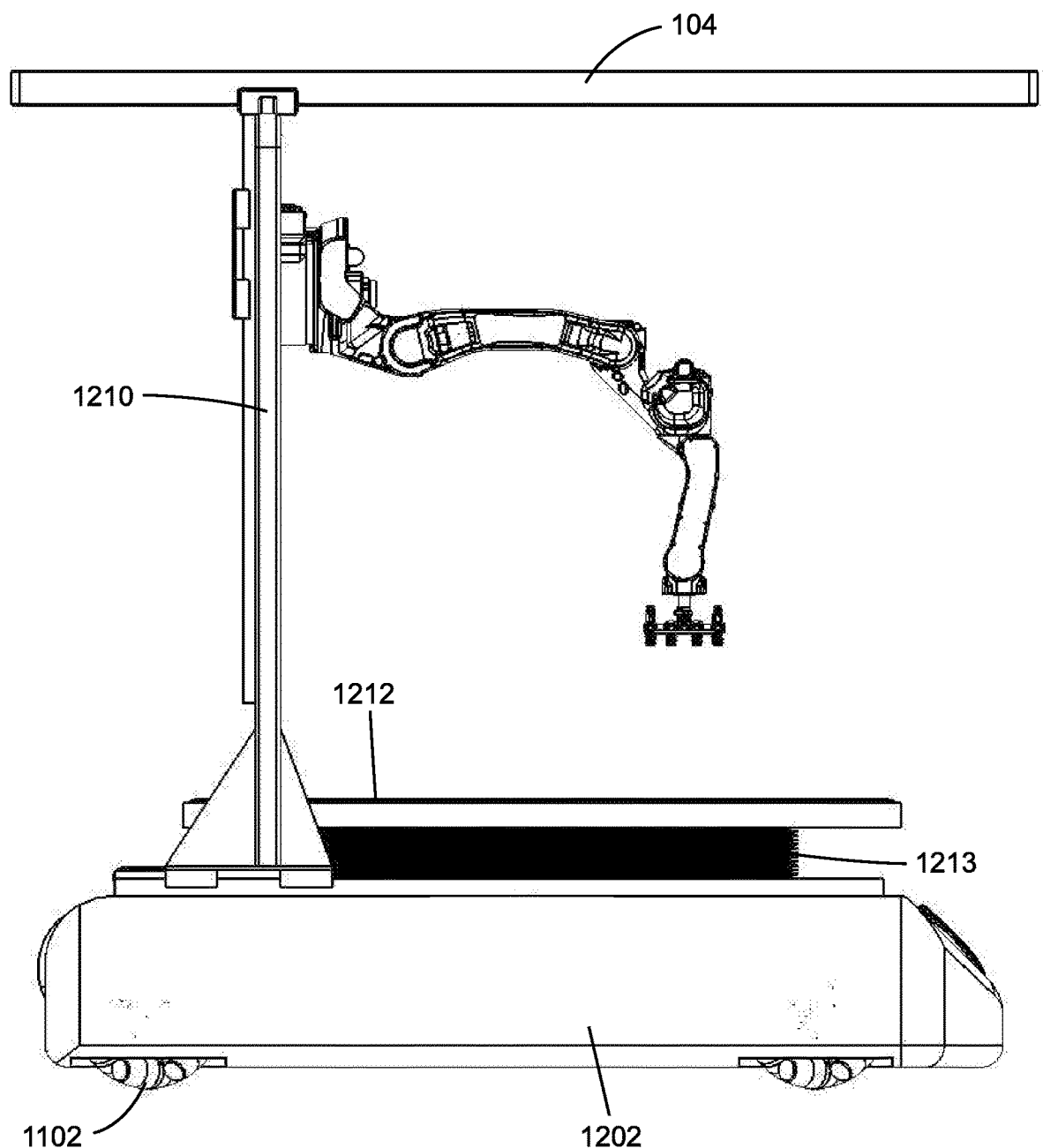
FIG. 15 is a right side view of the FIG. 12 AGV.
Figure 16:
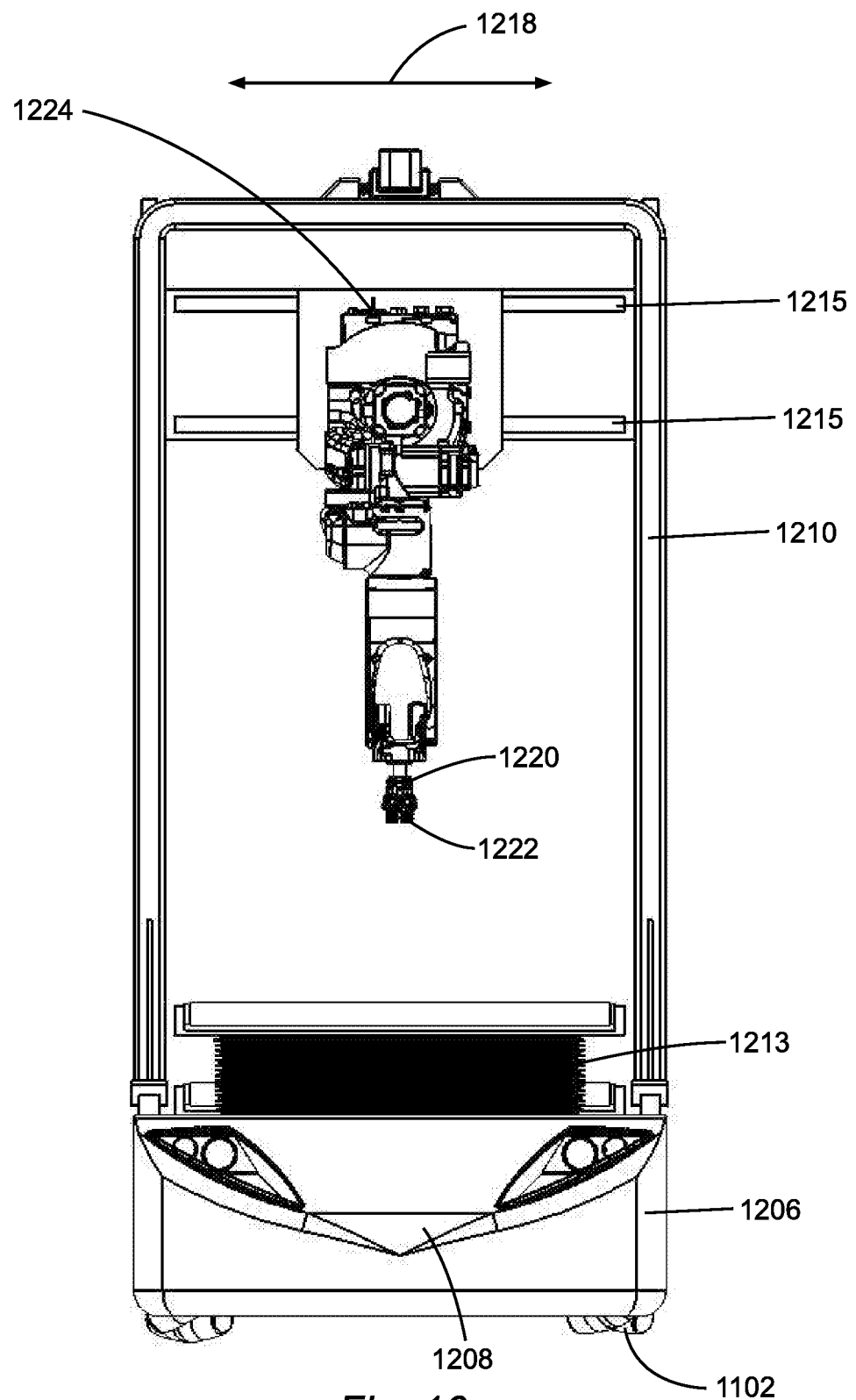
FIG. 16 is a front view of the FIG. 12 AGV.
Figure 17:
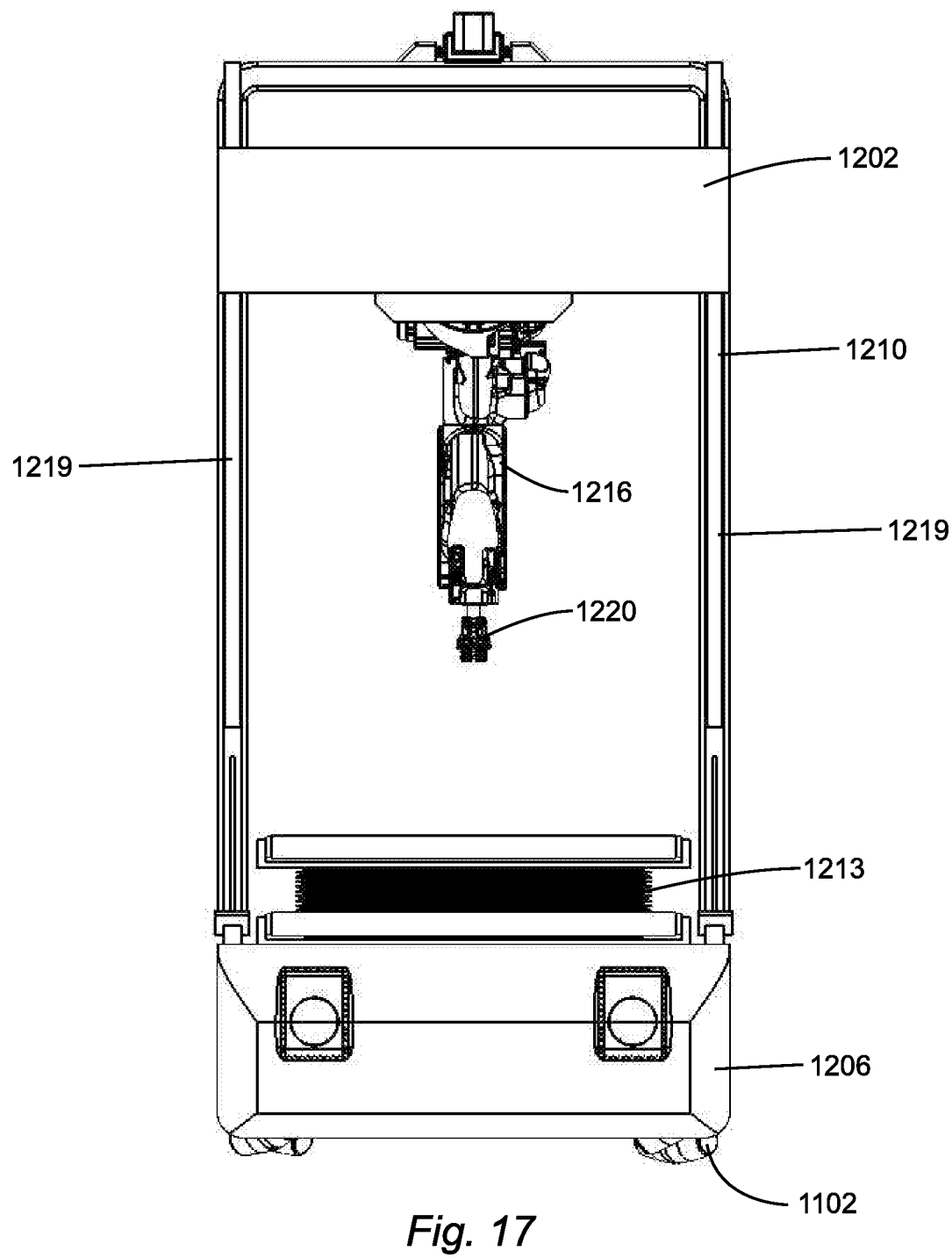
FIG. 17 is a rear view of the FIG. 12 AGV.

In one example, the loading table 1212 is designed to present up to twelve (12) "put" order storage containers (or totes 122) into the operational envelope of the robotic arm 1216. There are multiple ways that this can be accomplished. With one method, the loading table 1212 has a series of right angle transfers (RAT) with intelligent algorithms that move the correct chamber into the "put" position. In another method, the loading table 1212 moves relative to the rest of the AGV 1202 (e.g., down the aisle direction) so that the chambers are positioned in the correct "put" position. In still yet another method, the robotic arm 1216 moves along an XY gantry (similar to the FIG. 1 AGV 102) so that the robotic arm 1216 is able to move to any chamber location. A combination of these methods can be used in other examples. In one form, the storage containers or totes 122 in FIG. 12 are designed based on the dimensions of a KD-14 shipping carton. Alternatively or additionally, the loading table 1212 is configured to quickly discharge a batch of full chambers and then load a batch of empty chambers.

In some examples, the robotic arms described above include a Motoman MH5L robotic arm or a Motoman MH12 robotic arm with a 1.4 meter reach to better pick from two levels of donor totes in a carton flow rack. In the FIG. 12 example, the gantry 1214 that supports the robotic arm 1216 is generally located in the middle of the AGV 1202 with the ability to have the robotic arm 1216 pick from either side of a carton flow aisle. In another variation, the robotic arm 1216 is located on an XY Gantry suspension structure that spans the perimeter of the AGV 1202 to provide additional operational flexibility.

The EoATs described above can include a series of vacuum cups on pneumatic cylinders to extend and pick up or place anywhere objects such as from one to four bags. In order to have higher picking rates, it is desirable to pick multiple bags whenever possible while docked. To take advantage of existing business conditions, an EoAT that is capable of picking four (4) or more bags at the same time is used. In one example, the EoAT is capable of picking between 1 and 4 bags with a single robotic arm move. In one form, the EoAT is able pick all of the bag sizes present in eaches with the largest bag being 14"×8" and the smallest being 8"×6" but it should be recognized that other size of bags and other types of items (besides bags) can be handled by the EoAT. The picked bags are then able to be dropped in the chambers or totes 122 at any location. When bags are picked in one example, the bags are placed so the transport bag edge is toward one side so the transport edge will ultimately be down when the carton is packed out.

As noted before, the vision system 1224 is used for both picking and putting SKUs, such as bags, boxes, or other objects. The ability to locate the bag and provide the bag position information to the robotic arm can be accomplished in a number of manners. For instance, depending on the design of the donor totes, this ability to locate the bags can be done simply with height sensors, or through a full 3D vision system. In one example, the detection of when a donor tote is empty resides in a carton flow pick cell by logically counting the number of pick and puts of the robotic arm. While logically tracking bag levels in such a manner is possible in theory, it is typically not desirable in a number of practical situations because it can become inaccurate over time if robotic picking (or putting) accuracy is not 100% accurate. In other examples, physical detection of when a donor tote storage cell is empty is used. In one variation, an array of distance sensors sense when the bottom of the donor tote is visible in order to sense when the donor tote is empty or nearly empty.

In one particular layout of the AGV system 1200, three (3) bays of carton flow racks (stations 1204) are positioned on each side of the AGV aisle. Two or three vertical donor tote shelf levels with at least 30 pick faces are located on each side of the aisle. In this example, the donor totes are configured to contain flat bags. The pitch of the lanes is configured for smooth continuous flow with minimum back pressure. Gravity flow rails are used to control flow of the bags in the stations 1204, but some retarding rollers and/or motorized drive rollers can be used to control flow, if so desired. Empty donor totes are picked up by the robotic arm 1216 and placed on an empty donor tote takeaway conveyor. Individual pick cells are capable of receiving new donor totes, storing a specified amount of totes, and presenting a tote for picking to the AGV 1202. The number of donor totes to be stored locally can vary. In one design, seven (7) donor totes are stored locally, but alternative designs can have more or less totes, such as much as 240 totes, or even more. The pitch (i.e., down aisle separation) for repeating SKUs in between pick faces can vary, depending on whether Fast Eaches or Medium Eaches techniques are being used.

In one Fast Eaches approach, there is typically twelve feet (12 ft.) between storage pick face cells, while one example of a Medium Eaches approach typically has two feet (2 ft.) between storage pick face cells. In other examples, the pick cells can be moved and spaced in other arrangements. In the example illustrated in FIG. 12, each cell at the station 1204 has two vertical levels of donor totes. The bags or other SKUs in this example are pickable from the donor tote cells on both vertical levels. The heights of each level for donor totes can be based on the reference height and reach of the robotic arm 1216. In one form, the carton flow pick cell is controlled from a central PLC, and the communication lines for the motorized conveyors and sensors are routed through the PLC. This PLC in one form may act as the overall "Auto Eaches" control, or may be a dedicated PLC depending on other design constraints. When the PLC is a subsystem, the ability to track carton flow cell status and faults from the master PLC are built into the PLC. A Human Machine Interface (HMI) showing cell status can be provided for this PLC. To facilitate both inventory tracking and replenishment control, the number of donor totes present in a carton flow pick cell can be physically tracked such that both full and empty donor totes are monitored and tracked. In one example, a page on the HMI is displayed that shows the status of each cell and the donor totes present in each cell.

A further example of an AGV system 2400 will now be described with reference to FIGS. 24-30. As should be recognized, the AGV system 2400 shares a number of features in common with the AGV system 100 described with reference to FIG. 1, and more particularly, with the AGV system 1200 described with reference to FIGS. 12-23. For example, the AGV system 2400 includes the drive system 1206 with the omnidirectional wheels 1102, the loading table 1212 with the single conveyor 202, and the robotic arm 1216. Moreover, the AGV system 2400 operates a fashion similar to the AGV systems 100, 1200 described above. For the sake of clarity and brevity, the common features will not be again described in great detail but please refer to the description provided above.

Figure 24:
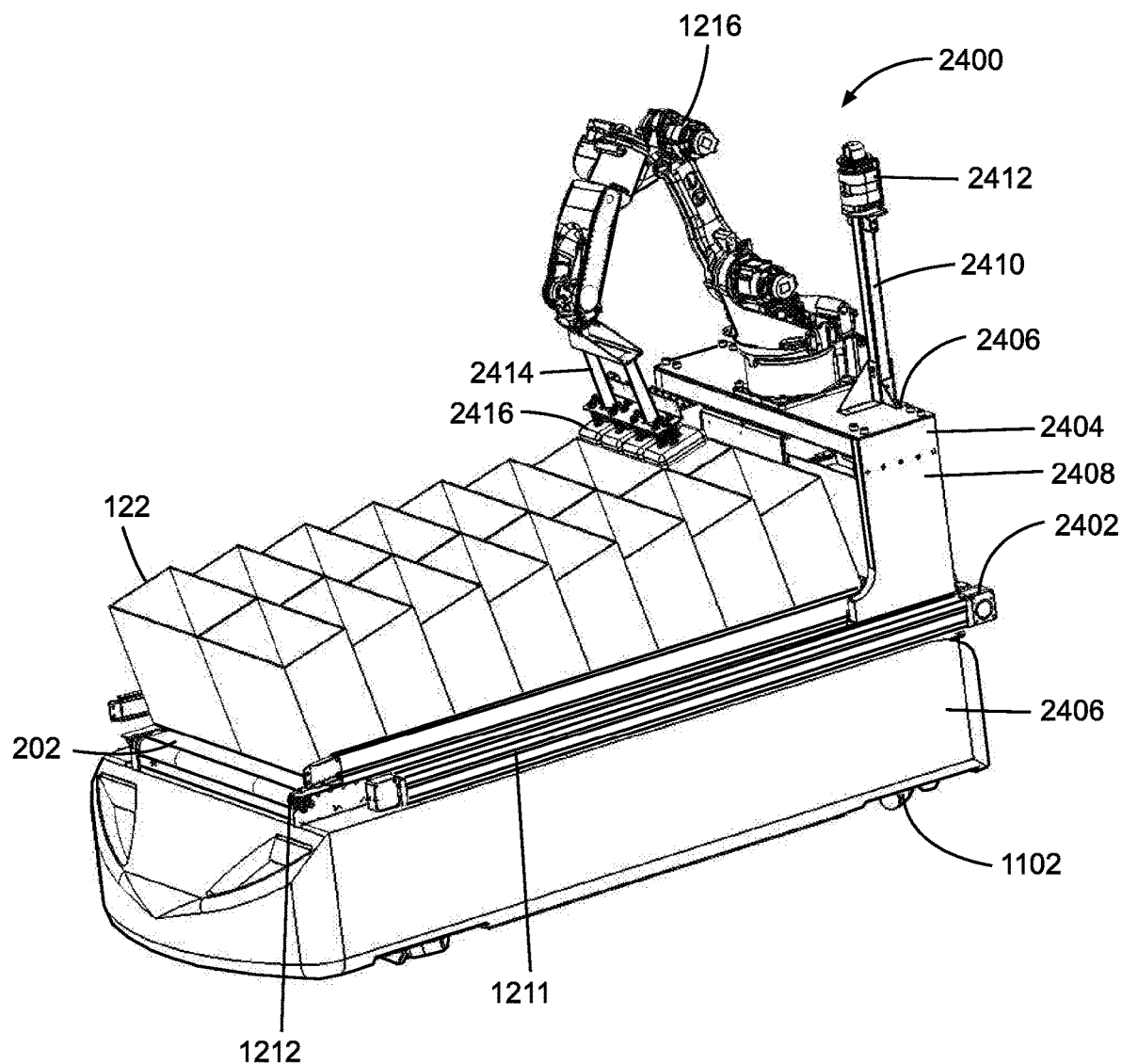
FIG. 24 is a front perspective view of another example of an AGV system loaded with boxes.
Figure 25:
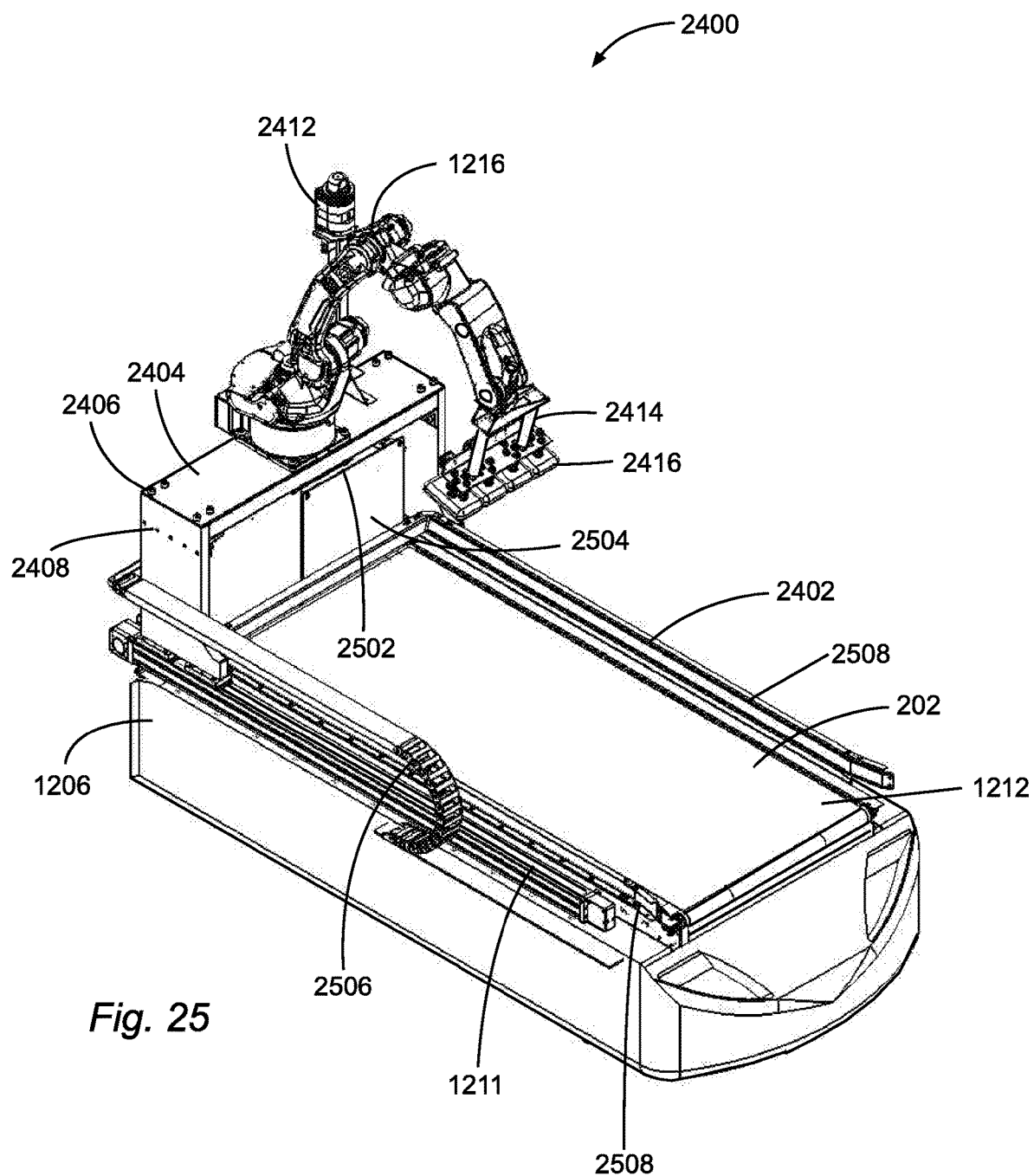
FIG. 25 is a front perspective view of the FIG. 24 AGV system without any of the boxes.
Figure 26:
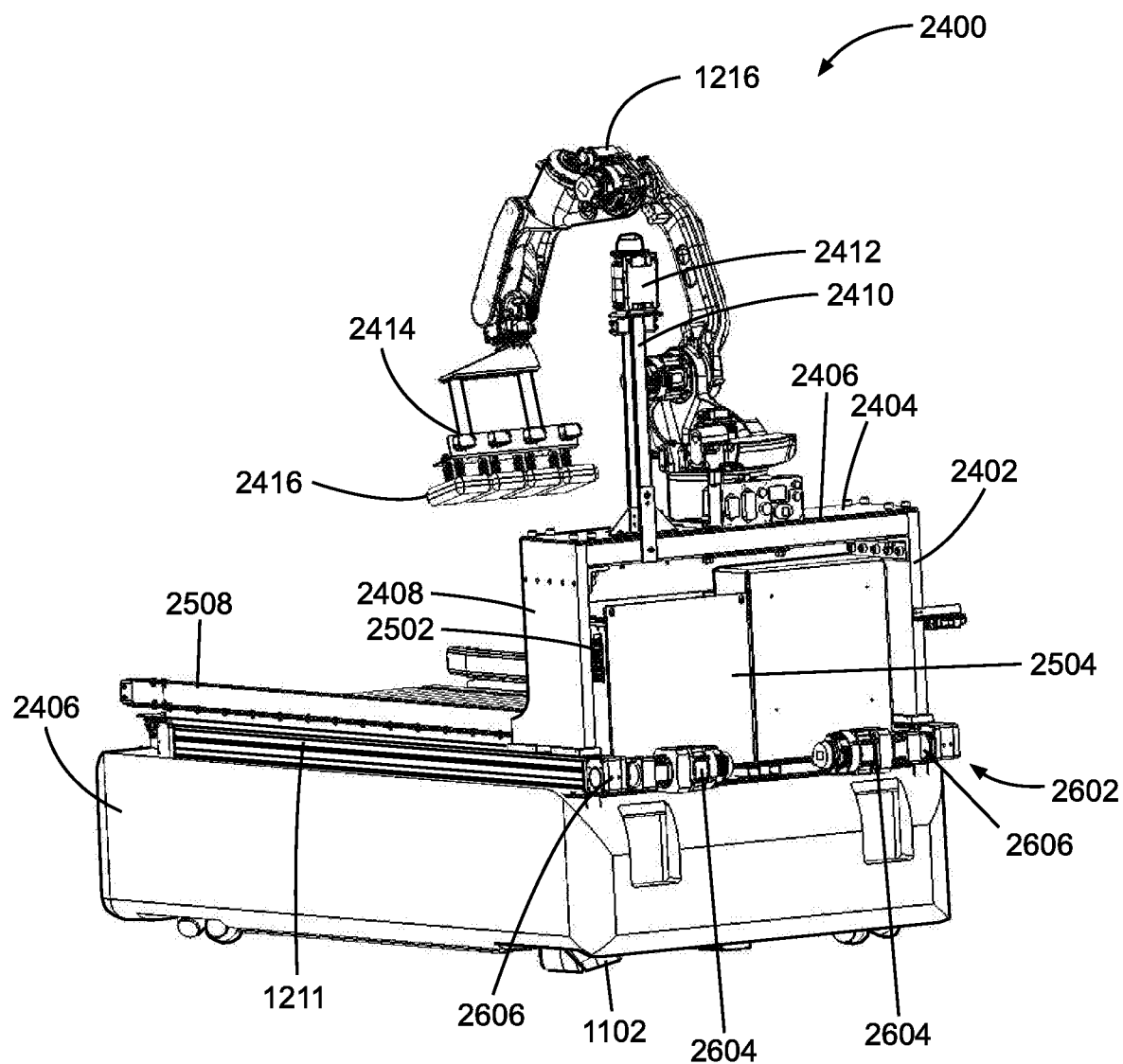
FIG. 26 is a rear perspective view of the FIG. 24 AGV system.

The AGV system 2400 includes an AGV 2402 configured to load and/or unload (i.e., pick and/or put) SKUs from the stations 1204 (FIG. 12). FIG. 24 shows a front perspective view of the AGV 2402 with the boxes, cartons, or totes 122 loaded on the loading table 1212. On the other hand, FIGS. 25 and 26 show front and rear perspective views of the AGV 2402 without the boxes or totes 122, respectively. In the illustrated example, the AGV 2402 is configured to hold up to sixteen (16) boxes or totes 122, but in other variations, the AGV 2402 can be designed to hold more or less totes 122. As shown, the totes 122 are arranged into two columns on the loading table 1212. The boxes or totes 122 in the depicted example have bottoms that are angled so that the openings of the boxes are likewise angled so as to facilitate loading and unloading of boxes. It should be recognized that the boxes or totes 122 in other examples can be shaped differently and come in other forms. As noted before, the loading table 1212 includes the single conveyor 202, which is in the form of a belt type conveyor, that is configured to load and unload the boxes or totes 122 from the AGV 2402. In the example shown, the loading table 1212 is vertically stationary, but in other variations, the loading table 1212 can include the lift mechanism 1213 of the type described above. Again, the loading table 1212 can be just a flat surface, can include multiple conveyors 202 of the type described above, include other types of conveyors, and/or can be moveable relative to the rest of the AGV 2402 so as to move or reorient objects on the table 1212.

With continued reference to FIGS. 24, 25, and 26, the robotic arm 1216 is supported by a robot support frame or gantry 2404. The gantry 2404 includes a robot support beam 2406 that spans across opposing support legs 2408. In the illustrated example, the robotic arm 1216 is mounted vertically in an upright position relative to the support beam 2406, but it should be recognized that the robotic arm 1216 can be hung or mounted in other ways relative to the gantry 2404. In the illustrated example, the gantry 2404 has a lower profile which in turn lowers the center of gravity of the AGV 2402. This turns stabilizes the AGV 2402 such that the stabilizer bar 104 (FIG. 1) is not required, though one could still be used. While only one robotic arm 1216 is illustrated, the gantry 2404 can support multiple robotic arms 1216, and the AGV 2402 can incorporate multiple gantries 2404. The support legs 2408 of the gantry 2404 are movably or slidably mounted to the rails 1211 that are positioned on opposite sides of the loading table 1212. With this configuration, the gantry 2404 along with the robotic arm 1216 is able to move along the columns of the totes 122 without any interference. A sensor mast 2410 is mounted to the robot support beam 2406, and a sensor system 2412 extends from the end of the sensor mast 2410. The sensor system 2412 includes a laser sensor system for controlling the movement of the AGV 2402 as well as for monitoring the robotic arm 1216, totes 122, and/or items during picking and/or placing. In another form, the sensor system 2412 is an ultrasonic type sensor, and in other forms, the sensor system 2412 can include 3-D vision systems. It should be appreciated that other types of sensors can be used in the sensor system 2412. Moreover, the robotic arm 1216 can further include other sensors, such as vision systems, laser sensors, and/or ultrasonic sensors, so as to control the operation of the robotic arm 1216. Like with the other examples, the robotic arm 1216 includes an EoAT 2414. The EoAT 2414 in the illustrated example includes one or more suction pads 2416 that are configured to pick up items, such as bags, using suction or a vacuum. In the illustrated example, the EoAT 2414 includes four (4) suction pads 2416 so that up to four items, such as bags, can be picked at the same time, but in other examples, the EoAT 2414 can include more or less suction pads 2416 than is shown.

Focusing on FIGS. 25 and 26, the AGV 2402 further includes a controller 2502 that controls the operation of the rest of the AGV 2402 along with the robotic arm 1216. The controller 2502 is protected by a protective housing 2504. As shown, the controller 2502 is positioned to readily nest underneath the gantry 2404 at one end of the AGV 2402. A flexible cable and hose carrier 2506 operatively connects the robotic arm 1216 to the AGV 2402. The flexible cable and hose carrier 2506 is able to bend at different locations so as to allow various cables and hoses to remain connected between the AGV 2402 and the gantry 2404 when the gantry 2404 moves. The cabling in the carrier 2506 can include power cables and communication cables for respectively powering and controlling the robotic arm 1216. The communication cables within the carrier 2506 provides a communication pathway between the controller 2502 and the robotic arm 1216. In other examples, the robotic arm 1216 is controlled wirelessly. The hoses within the carrier 2506 can for example include pneumatic and/or hydraulic hoses for supplying pneumatic and/or hydraulic power to the robotic arm 1216. As depicted, guide rails 2508 are positioned on opposite sides of the loading table 1212 so as to prevent the totes 122 from interfering with the movement of the gantry 2404 as well as the carrier 2506. Moreover, the guide rails 2508 assist in aligning the totes 122 on the loading table 1212 and prevent the totes 122 from falling off of the AGV 2402.

Figure 27:
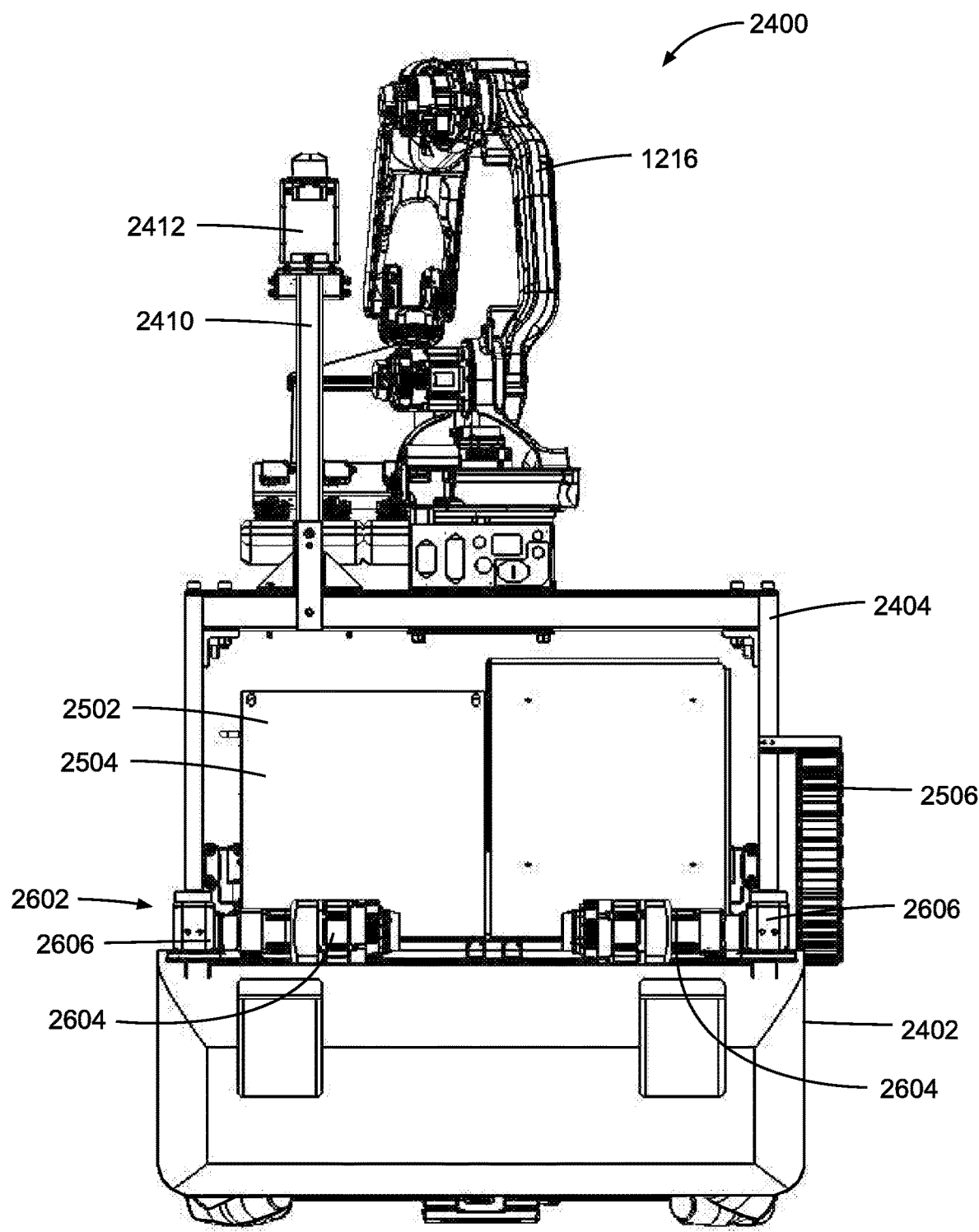
FIG. 27 is a rear view of the FIG. 24 AGV system.
Figure 28:
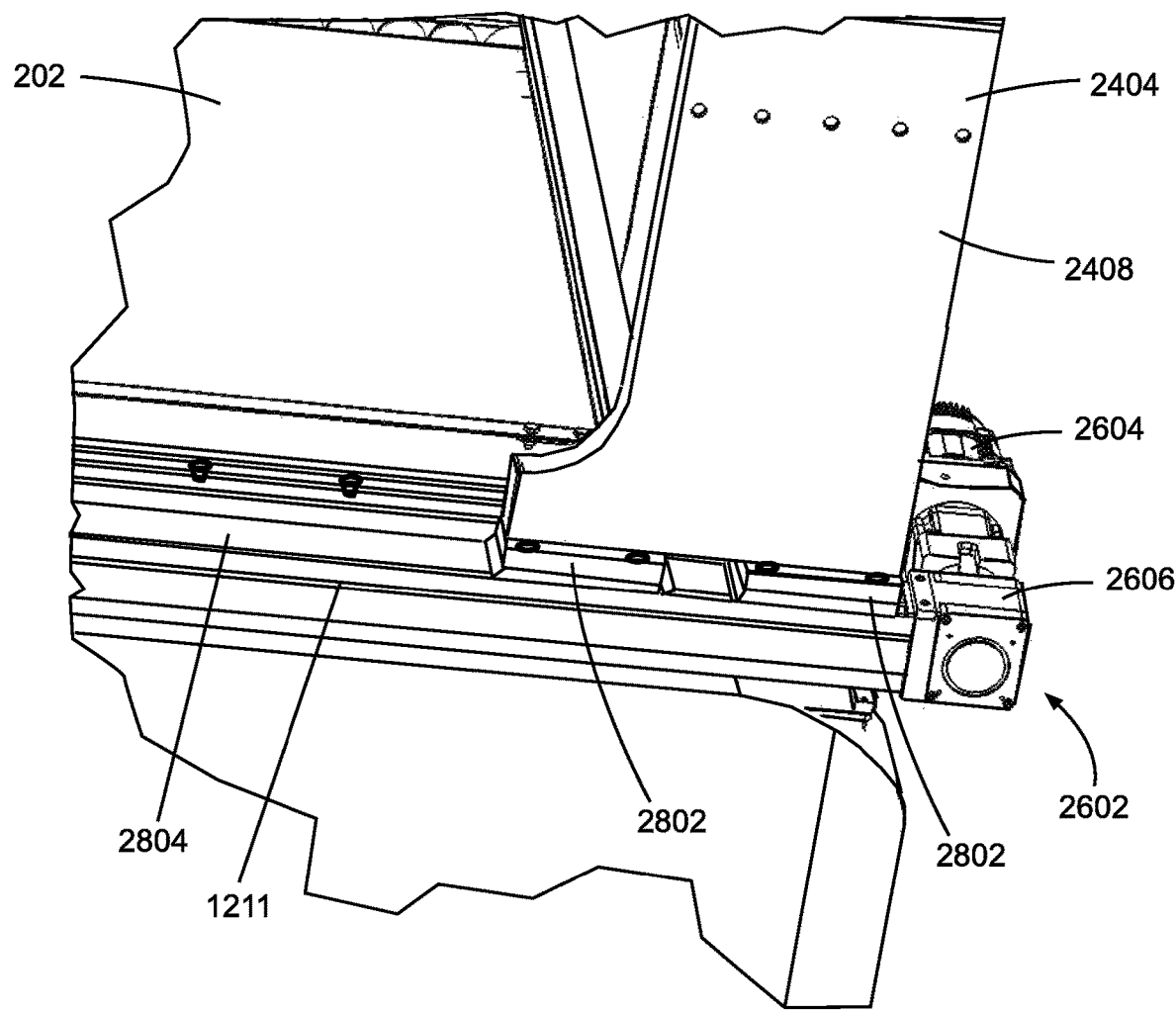
FIG. 28 is an enlarged view of a gantry drive system for the FIG. 24 AGV system.
Figure 29:
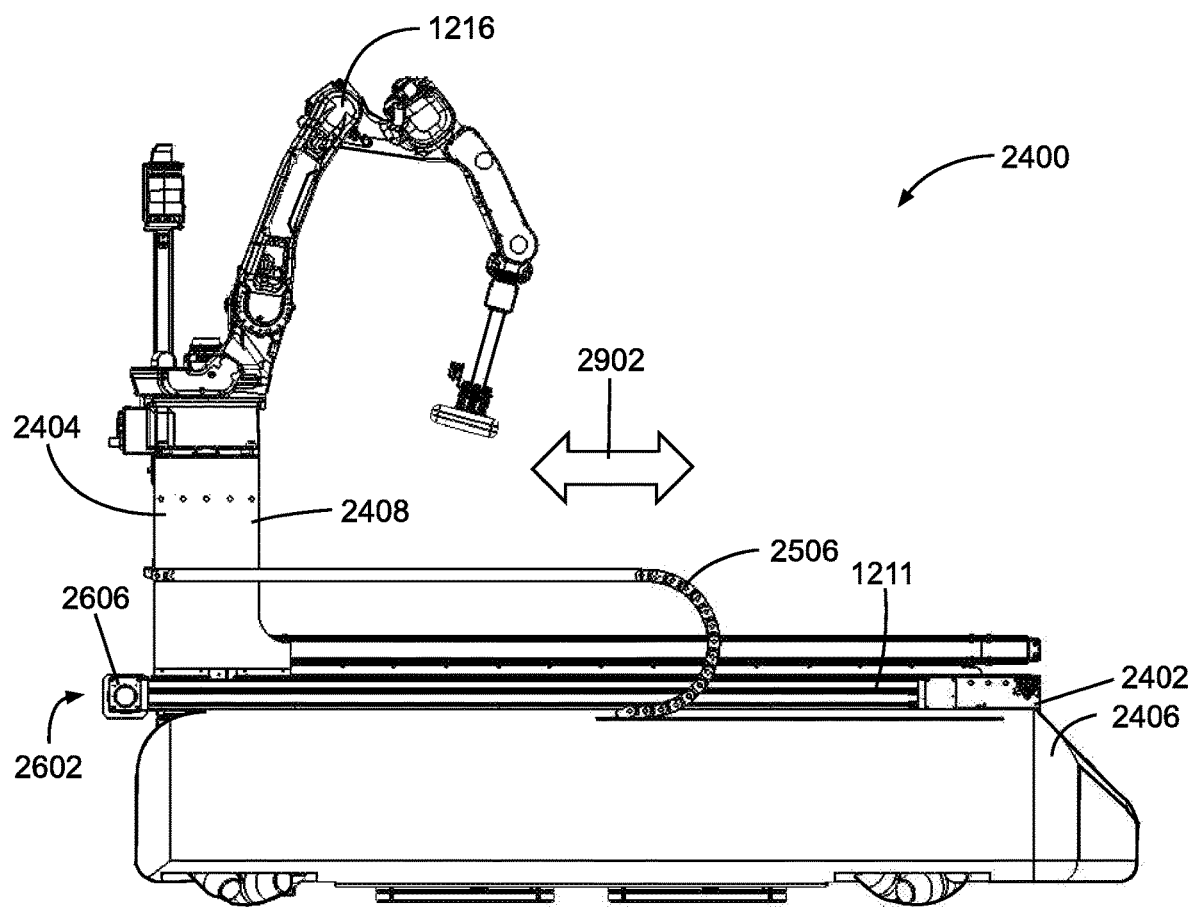
FIG. 29 is a side view of the FIG. 24 AGV system.

Looking at FIGS. 26, 27, and 28, the AGV 2402 includes a gantry drive system 2602 that is configured to move the gantry 2404 along the length of the AGV 2402. As illustrated, the gantry drive system 2602 includes one or more drive motors 2604 that are operatively connected to one or more gearboxes 2606. In the illustrated example, the gantry drive system 2602 includes two drive motors 2604 and associated gearboxes 2606, one for each rail 1211. In other examples, the gantry drive system 2602 can include a single drive motor 2604 and/or gearbox 2606 that drives the gantry 2404 along both rails 1211, or more than two drive motors 2604 and/or gearboxes 2606. The drive motors 2604 in one example are servomotors, but other types of motors can be used, such as pneumatic motors and/or hydraulic motors. The gearboxes 2606 are used to step up or step down the output from the drive motors 2604. In other variations, the drive motors 2604 can be used to directly move the gantry 2404 without the need of the gearboxes 2606.

FIG. 28 shows an enlarged perspective view of one of the support legs 2408 along with the gantry drive system 2602. As shown, the support legs 2408 of the gantry 2404 include one or more bearing guides 2802 that are slidably received on the rails 1211. The bearing guides 2802 are designed to minimize friction between the support legs 2408 and the rails 1211 such as via bearings and/or lubrication so that the gantry 2404 is able to easily move or slide along the rails 1211. In the illustrated example, the bearing guides 2802 are clamped or otherwise secured to a drive belt 2804 that is located in each rail 1211. The drive belt 2804 is driven by the drive motors 2604 via the gearboxes 2606. Both support legs 2408 of the gantry 2404 are driven by the drive belts 2804 in the depicted example, but in other variations, only one of the rails 1211 is driven by a single drive belt 2804. It should be recognized that the gantry 2404 can be driven in other ways such as via a screw type drive, chain drive, and/or electromagnetic driver, to name just a few examples. As indicated by double arrow 2902 in FIG. 29, the gantry drive system 2602 is able to position the robotic arm 1216 along the entire length of the loading table 1212 in the AGV 2402. This allows the robotic arm 1216 to efficiently service a large number of batches of items over a wide area of the loading table 1212 at a single time so that a greater number of totes 122 can be serviced, even those that would normally be out of reach for the robotic arm 1216. In other words, the moveable nature of the gantry 2404 increases the degrees of freedom of the robotic arm 1216 so as to facilitate batch servicing of items with the AGV 2402. Again, this ability to batch process items with the AGV 2402 enhances operational efficiency because multiple orders can be processed at the same time.

Figure 30:
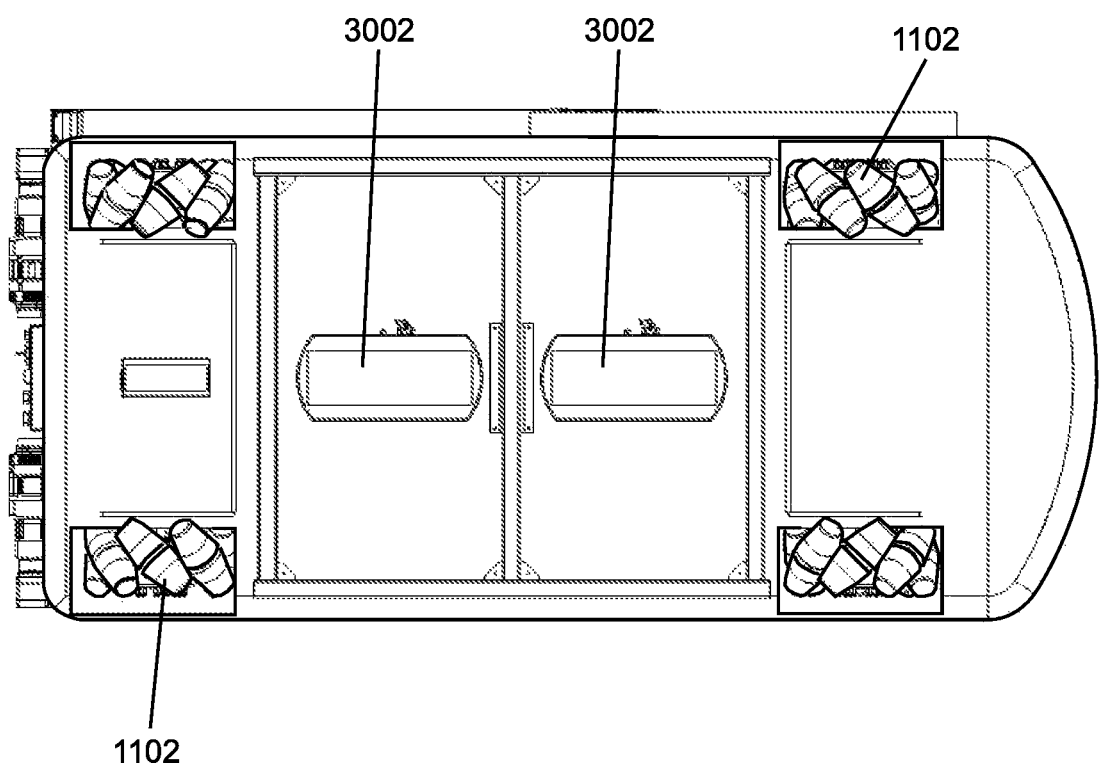
FIG. 30 is a bottom view of the FIG. 24 AGV system.

FIG. 30 shows a bottom view of the AGV 2402. Like with the prior examples, the AGV 2402 includes the omnidirectional wheels 1102 that allow the AGV 2402 to move both in a longitudinal direction (i.e., forwards and backwards) as well as in a lateral direction (i.e., side to side). As depicted, the bottom of the AGV 2402 further includes one or more inductive pickups 3002 that facilitate inductive (i.e., wireless) power charging of the AGV the 2402. The inductive pickups 3002 allow the AGV 2402 to be recharged even on the fly while the AGV 2402 is servicing various stations 1204. This in turn increases the uptime of the AGV system 2400.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

Automated Guided Vehicle (AGV)—generally refers to a mobile robot that is able to automatically self-navigate between various locations. For example, AGVs are typically, but not always, able to automatically navigate by following markers, such as wires or magnets embedded in the floor, by using lasers, and/or by using a vision systems. AGVs are also typically, but not always, designed to also automatically avoid collisions, such as with other AGVs, equipment, and personnel. AGVs are commonly, but not always, used in industrial applications to move materials around a manufacturing facility or warehouse.

Conveyor—generally refer to a mechanism that is used to transport something, like an object, SKU, and/or a storage container. By way of nonlimiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

Eaches (or Pieces)—generally refers to individual picks of products or SKUs for order fulfillment purposes. Typically, but not always, picks of SKUs are performed either in an aggregate manner by cases (or some other form of packaging) or individually by a piece-picked (eaches) approach.

End of Arm Tool (EoAT) or End Effector—generally refers to a device at the end of the robotic arm that is designed to interact with the environment. The nature of this interaction of the device with the environment depends on the application of the robotic arm. The EoAT can for instance interact with an SKU or other environmental objects in a number of ways. For example, the EoAT can include one or more grippers, such as impactive, ingressive, astrictive, and/or contiguitive type grippers. Grippers typically, but always, use some type of mechanical force to grip objects. However, other types of interactions, such as those based on suction or magnetic force, can be used to secure the object to the EoAT. By way of non-limiting examples, the EoAT can alternatively or additionally include vacuum cups, electromagnets, Bernoulli grippers, electrostatic grippers, van der Waals grippers, capillary grippers, cryogenic grippers, ultrasonic grippers, and laser grippers, to name just a few.

Gantry—generally refers to a frame or other structure raised on supports so as to span over, around, and/or into something. The supports and frame structure can come in many forms. For instance, the supports can be independent structures or incorporated to form a unitary structure.

Robotic arm—generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "end of arm tool" (EoAT) for holding, manipulating, or otherwise interacting with the cargo items or other objects. The EoAT can be configured in many forms besides what is shown and described herein.

Stock Keeping Unit (SKU) or Item—generally refers to an individual article or thing. The SKU can come in any form and can be packaged or unpackaged. For instance, SKU can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

Storage Container—generally refers to an object that can be used to hold or transport SKUs or other objects. By way of nonlimiting examples, the storage container can include cartons, totes, pallets, bags, and/or boxes.

Vision System—generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, analog-to-digital conversion (ADC), and digital signal processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method, comprising:
   moving an automated guided vehicle (AGV) to a storage station, wherein the AGV includes
      a loading table upon which containers are supported, and
      a robotic arm coupled to a gantry that locates the robotic arm above the containers; and
   transporting items with the robotic arm between the storage station and the containers;
   wherein the loading table includes a conveyor on which the containers are disposed;
   maintaining the conveyor at a stationary position relative to the rest of the AGV during said transporting; and
   wherein said transporting includes servicing the containers on the conveyor by moving the gantry relative to the conveyor when the conveyor is at the stationary position.

2. The method of claim 1, wherein said transporting the items includes:
   picking the items from the station with the robotic arm; and
   placing the items into the containers with the robotic arm.

3. The method of claim 1, wherein said transporting the items includes:
   picking the items from the containers with the robotic arm; and
   placing the items into the storage station with the robotic arm.

4. The method of claim 1, further comprising:
   moving the AGV to a second storage station; and
   transporting second items with the robotic arm between the second storage station and the containers.

5. The method of claim 1, further comprising:
   repositioning the robotic arm by moving the gantry relative to the loading table on the AGV.

6. The method of claim 1, further comprising:
   moving the robotic arm relative to the gantry.

7. The method of claim 1, further comprising:
   wherein the loading table includes a conveyor; and
   unloading the containers from the AGV with the conveyor.

8. The method of claim 1, further comprising:
   moving the containers in a vertical direction by moving the loading table in the vertical direction.

9. The method of claim 1, wherein:
   the robotic arm includes an end of arm tool with separate suction pads; and
   said transporting the items includes picking the items at the same time with the separate suction pads.

10. The method of claim 1, further comprising:
    unloading the containers from the AGV with the conveyor.

11. The method of claim 1, further comprising:
    loading the containers onto the AGV with the conveyor.

12. The method of claim 1, further comprising:
    wherein the AGV includes a propulsion mechanism;
    moving the AGV along a floor or ground with the propulsion mechanism; and
    moving the robotic arm relative to the containers on the loading table by moving the gantry relative to the loading table.

13. The method of claim 12, wherein:
    said moving the robotic arm includes moving the gantry in a longitudinal direction relative to the loading table;
    the propulsion mechanism includes one or more omnidirectional wheels; and
    said moving the AGV includes moving the AGV with the omnidirectional wheels in a lateral direction that is transverse to the longitudinal direction.

14. The method of claim 1, further comprising:
    moving the robotic arm with the gantry relative to the containers on the loading table.

15. The method of claim 1, wherein:
    the gantry has at least two legs movably mounted on opposing sides of the loading table with a robot support beam spanning between the legs;
    the robotic arm is mounted to the support beam; and
    moving the gantry relative to the loading table with the containers located between the legs and underneath the support beam of the gantry.

16. The method of claim 1, further comprising:
    moving the loading table in a vertical direction with a lift mechanism.

17. The method of claim 1, further comprising:
    wherein the loading table includes at least two conveyors on which the containers rest; and
    reorienting the containers relative to the loading table with the conveyors.

18. The method of claim 1, wherein:
    the robotic arm includes an End of Arm Tool (EoAT); and
    said transporting the items includes picking up at least two of the items with the EoAT at the same time.

19. The method of claim 1, further comprising:
    moving at least one of the containers between the AGV and the storage station with the robotic arm.

20. The method of claim 1, further comprising:
    moving the AGV in an alley defined between the storage station and a second storage station located opposite the storage station; and transporting at least one of the items with the robotic arm between the second storage station and the containers.

21. The method of claim 1, further comprising:

charging the AGV wirelessly via one or more inductive pickups on the AGV.

\* \* \* \* \*